United States Patent
Miyamoto

(10) Patent No.: US 10,873,732 B2
(45) Date of Patent: Dec. 22, 2020

(54) IMAGING DEVICE, IMAGING SYSTEM, AND METHOD OF CONTROLLING IMAGING DEVICE

(71) Applicant: SONY SEMICONDUCTOR SOLUTIONS CORPORATION, Kanagawa (JP)

(72) Inventor: Takayoshi Miyamoto, Tokyo (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 16/489,235

(22) PCT Filed: Dec. 20, 2017

(86) PCT No.: PCT/JP2017/045695
§ 371 (c)(1),
(2) Date: Aug. 27, 2019

(87) PCT Pub. No.: WO2018/179624
PCT Pub. Date: Oct. 4, 2018

(65) Prior Publication Data
US 2020/0014899 A1   Jan. 9, 2020

(30) Foreign Application Priority Data
Mar. 30, 2017   (JP) ................. 2017-067104

(51) Int. Cl.
*H04N 9/73* (2006.01)
*H04N 9/04* (2006.01)

(52) U.S. Cl.
CPC .......... *H04N 9/735* (2013.01); *H04N 9/0451* (2018.08)

(58) Field of Classification Search
CPC ........ H04N 9/735; H04N 9/0451; H04N 9/73; H04N 9/04; H04N 5/2258
See application file for complete search history.

(56) References Cited

U.S. PATENT DOCUMENTS 6,618,091 B1 * 9/2003 Tamura ............... H04N 5/2352
348/223.1
2013/0070059 A1   3/2013 Kushida
(Continued)

FOREIGN PATENT DOCUMENTS

CN   102845069 A   12/2012
JP   2003-101867 A   4/2003
(Continued)

OTHER PUBLICATIONS

International Search Report and Written Opinion of PCT Application No. PCT/JP2017/045695, dated Mar. 13, 2018, 06 pages of ISRWO.

*Primary Examiner* — Shahbaz Nazrul
(74) *Attorney, Agent, or Firm* — Chip Law Group

(57) ABSTRACT

An imaging device includes a plurality of optical systems having different angles of view. A wide-angle-side light detection unit detects a plurality of wide-angle-side color components in each of a plurality of regions in wide-angle image data having an angle of view wider than a predetermined value. A telephoto-side light detection unit detects a plurality of telephoto-side color components in each of a plurality of regions in telephoto image data having an angle of view narrower than the predetermined value. A telephoto-side white balance gain acquisition unit obtains a gain for the telephoto image data on the basis of a wide-angle-side integration ratio that is a ratio of respective integration values of the plurality of wide-angle-side color components and the plurality of telephoto-side color components as a telephoto-side white balance gain. A telephoto-side white (Continued)

balance correction unit corrects the telephoto image data with the telephoto-side white balance gain.

16 Claims, 28 Drawing Sheets

(56) References Cited

U.S. PATENT DOCUMENTS

| | | |
|---|---|---|
| 2014/0078247 A1 | 3/2014 | Shohara et al. |
| 2016/0028949 A1* | 1/2016 | Lee .................... H04N 5/23296 |
| | | 348/218.1 |
| 2018/0033155 A1* | 2/2018 | Jia ...................... H04N 5/23235 |
| 2019/0122349 A1* | 4/2019 | Cohen .................... H04N 5/265 |
| 2019/0356892 A1* | 11/2019 | Takasumi ................. H04N 9/07 |

FOREIGN PATENT DOCUMENTS

| | | |
|---|---|---|
| JP | 2012-216979 A | 11/2012 |
| JP | 2013-219561 A | 10/2013 |
| JP | 2014-078926 A | 5/2014 |
| WO | 2012/132290 A1 | 10/2012 |

* cited by examiner

FIG. 8

| TYPE | AREA IDENTIFICATION NUMBER | CALCULATION RESULT |
|---|---|---|
| WIDE-ANGLE-SIDE R/G COMPONENT RATIO | A0 | 1/2 |
| | A1 | 1 |
| | ⋮ | ⋮ |
| | An | 5/3 |
| WIDE-ANGLE-SIDE B/G COMPONENT RATIO | A0 | 1 |
| | A1 | 20 |
| | ⋮ | ⋮ |
| | An | 1 |
| DETERMINATION RESULT | A0 | 0 (OUTSIDE INTEGRATION RANG) |
| | A1 | 1 (WITHIN INTEGRATION RANGE) |
| | ⋮ | ⋮ |
| | An | 1 |

FIG. 9

| TYPE | AREA IDENTIFICATION NUMBER | CALCULATION RESULT OR DETECTION VALUE | DETERMINATION RESULT |
|---|---|---|---|
| WIDE-ANGLE-SIDE R COMPONENT | A0 | 10 | 0 |
| | A1 | 5 | 1 |
| | ⋮ | ⋮ | ⋮ |
| | An | 50 | 1 |
| R INTEGRATION VALUE | — | 55 | — |
| WIDE-ANGLE-SIDE G COMPONENT | A0 | 20 | 0 |
| | A1 | 5 | 1 |
| | ⋮ | ⋮ | ⋮ |
| | An | 30 | 1 |
| G INTEGRATION VALUE | — | 35 | — |
| WIDE-ANGLE-SIDE B COMPONENT | A0 | 20 | 0 |
| | A1 | 100 | 1 |
| | ⋮ | ⋮ | ⋮ |
| | An | 30 | 1 |
| B INTEGRATION VALUE | — | 130 | — |
| WIDE-ANGLE-SIDE R/G INTEGRATION RATIO | — | 1.57 | — |
| WIDE-ANGLE-SIDE B/G INTEGRATION RATIO | — | 3.71 | — |

IMAGING DEVICE, IMAGING SYSTEM, AND METHOD OF CONTROLLING IMAGING DEVICE

CROSS REFERENCE TO RELATED APPLICATIONS

This application is a U.S. National Phase of International Patent Application No. PCT/JP2017/045695 filed on Dec. 20, 2017, which claims priority benefit of Japanese Patent Application No. JP 2017-067104 filed in the Japan Patent Office on Mar. 30, 2017. Each of the above-referenced applications is hereby incorporated herein by reference in its entirety.

TECHNICAL FIELD

The present technology relates to an imaging device, an imaging system, and a method of controlling an imaging device. More specifically, the present technology relates to an imaging device that performs white balance correction, an imaging system, and a control method of an imaging device.

BACKGROUND ART

Conventionally, devices, which image image data, have performed white balance correction for the purpose of projecting an original color of an object. For example, an imaging device provided with a main imaging element for imaging an image and a detection imaging element for detecting a color component, and which performs white balance correction with a gain calculated from the color component detected by the detection imaging element has been proposed (for example, see Patent Document 1).

CITATION LIST

Patent Document

Patent Document 1: Japanese Patent Application Laid-Open No. 2003-101867

SUMMARY OF THE INVENTION

Problems to be Solved by the Invention

In the above-described conventional technology, the detection of the color component and the imaging of the image can be simultaneously executed. Therefore, a frame rate of the imaging can be improved as compared with a case of sequentially performing detection and imaging. However, if white balance correction is performed by a similar method for each optical system in an imaging device provided with a plurality of optical systems having different angles of view, there is a possibility of a decrease in accuracy of white balance correction. For example, in a case where a part of an object in a wide-angle-side image data is enlarged on a telephoto side and captured, color components of the entire object can be detected and the gain can be set on the wide-angle side, whereas on the telephoto side, only a part of the color components of the object can be detected. Therefore, the accuracy of white balance correction is decreased on the telephoto-side image as compared with the wide-angle side.

The present technology has been made in view of such a situation, and an objective of the present technology is to improve the accuracy of the white balance correction in an imaging device provided with a plurality of optical systems having different angles of view.

Solutions to Problems

The present technology has been made to solve the above-described problems, and a first aspect of the present technology is an imaging device and a method of controlling the imaging device, the imaging device including: a wide-angle-side light detection unit configured to detect a plurality of wide-angle-side color components in each of a plurality of regions in a wide-angle image data having an angle of view wider than a predetermined value; a telephoto-side light detection unit configured to detect a plurality of telephoto-side color components in each of a plurality of regions in a telephoto image data having an angle of view narrower than the predetermined value; a telephoto-side white balance gain acquisition unit configured to obtain a gain for the telephoto image data on the basis of a wide-angle-side integration ratio that is a ratio of respective integration values of the plurality of wide-angle-side color components and the plurality of telephoto-side color components as a telephoto-side white balance gain; and a telephoto-side white balance correction unit configured to correct the telephoto image data with the telephoto-side white balance gain. The above configuration brings an effect that the telephoto image data is corrected with the telephoto-side white balance gain obtained on the basis of the wide-angle-side integration ratio and the plurality of telephoto-side color components.

Furthermore, in the first aspect, the telephoto-side white balance gain acquisition unit may set a predetermined range including the wide-angle-side integration ratio as a telephoto-side integration range, and calculate a gain according to a telephoto-side integration ratio that is a ratio of respective integration values of the plurality of telephoto-side color components within the telephoto-side integration range as the telephoto-side white balance gain. The above configuration brings the effect that the telephoto image data is corrected with the gain according to the ratio of respective integration values of the plurality of telephoto-side color components within the telephoto-side integration range.

Furthermore, in the first aspect, the plurality of telephoto-side color components may include a red (R) component, a green (G) component, and a blue (B) component, and the telephoto-side white balance gain acquisition unit may set, as the telephoto-side integration range, a range having a predetermined shape centered on the wide-angle-side integration ratio in an orthogonal coordinate system having a ratio of the R component and the G component and a ratio of the B component and the G component as coordinate axes. The above configuration brings an effect that the telephoto-side color components are integrated within the range having a predetermined shape centered on the wide-angle-side integration ratio in the orthogonal coordinate system.

Furthermore, in the first aspect, the telephoto-side integration range may be rectangular. The above configuration brings an effect that the telephoto-side color components within a rectangular integration range are integrated.

Furthermore, in the first aspect, the telephoto-side integration range may be circular. The above configuration brings the effect that the telephoto-side color components within a circular integration range are integrated.

Furthermore, in the first aspect, the telephoto-side integration range may be elliptical. The above configuration brings the effect that the telephoto-side color components within an elliptical integration range are integrated.

Furthermore, in the first aspect, a wide-angle-side white balance gain acquisition unit configured to calculate a ratio of respective integration values of the plurality of wide-angle-side color components within a predetermined wide-angle-side integration range as the wide-angle-side integration ratio, and acquires a gain according to the wide-angle-side integration ratio as a wide-angle-side white balance gain, and a wide-angle-side white balance correction unit configured to correct the wide-angle image data with the wide-angle-side white balance gain may be further included. The above configuration brings an effect that the wide-angle image data is corrected with the gain according to the ratio of respective integration values of the plurality of wide-angle-side color components within the predetermined wide-angle-side integration range.

Furthermore, in the first aspect, a side of the telephoto-side integration range may be parallel to a side of the predetermined wide-angle-side integration range. The above configuration brings the effect that the telephoto-side color components within the telephoto-side integration range having the side parallel to the wide-angle-side integration range are integrated.

Furthermore, in the first aspect, the plurality of telephoto-side color components may include an R component, a G component, and a B component, and the telephoto-side white balance gain acquisition unit sets, as the telephoto-side integration range, an overlapping range between a range having a predetermined shape centered on the wide-angle-side integration ratio and a preset reference integration range in an orthogonal coordinate system having a ratio of the R component and the G component and a ratio of the B component and the G component as coordinate axes The above configuration brings an effect that the telephoto image data is corrected with the gain calculated in the overlapping range between a range having a predetermined shape centered on the wide-angle-side integration ratio and a preset reference integration range.

Furthermore, in the first aspect, the wide-angle-side white balance gain acquisition unit may determine presence or absence of reliability of the plurality of wide-angle-side color components within the predetermined wide-angle-side integration range, and calculate the wide-angle-side integration ratio in a case where there is the reliability. The above configuration brings an effect that the wide-angle-side integration ratio is calculated on the basis of the wide-angle-side color components with reliability.

Furthermore, in the first aspect, the wide-angle-side white balance gain acquisition unit may determine whether or not the number of color components exceeding a prescribed value is larger than a predetermined number, for each of the plurality of wide-angle-side color components, and determine the presence or absence of the reliability on the basis of a determination result. The above configuration brings an effect that the wide-angle-side integration ratio is calculated on the basis of the number of wide-angle-side color components exceeding a prescribed value, the number being larger than the predetermined number.

Furthermore, in the first aspect, the telephoto-side white balance gain acquisition unit may determine the presence or absence of the reliability of the plurality of telephoto-side color components within the telephoto-side integration range, and calculate the telephoto-side integration ratio in a case where there is the reliability. The above configuration brings an effect that the telephoto-side integration ratio is calculated on the basis of the telephoto-side color components with reliability.

Furthermore, in the first aspect, the telephoto-side white balance gain acquisition unit may determine whether or not the number of color components exceeding a prescribed value is larger than a predetermined number, for each of the plurality of telephoto-side color components, and determine the presence or absence of the reliability on the basis of a determination result. The above configuration brings an effect that the telephoto-side integration ratio is calculated on the basis of the number of telephoto-side color components exceeding a prescribed value, the number being larger than the predetermined number.

Further, a third aspect of the present technology is an imaging system including: a wide-angle-side light detection unit configured to detect a plurality of wide-angle-side color components in each of a plurality of regions in a wide-angle image data having an angle of view wider than a predetermined value; a telephoto-side light detection unit configured to detect a plurality of telephoto-side color components in each of a plurality of regions in a telephoto image data having an angle of view narrower than the predetermined value; a telephoto-side white balance gain acquisition unit configured to obtain a gain for the telephoto image data on the basis of a wide-angle-side integration ratio that is a ratio of respective integration values of the plurality of wide-angle-side color components and the plurality of telephoto-side color components as a telephoto-side white balance gain; a telephoto-side white balance correction unit configured to correct the telephoto image data with the telephoto-side white balance gain; and a recording unit configured to record the corrected telephoto image data. The above configuration brings an effect of recording the telephoto image data corrected with the telephoto-side white balance gain obtained on the basis of the wide-angle-side integration ratio and the plurality of telephoto-side color components.

Effects of the Invention

According to the present technology, in an imaging device provided with a plurality of optical systems having different angles of view, an excellent effect of improving accuracy of white balance correction can be exhibited. Note that effects described here are not necessarily limited, and any of effects described in the present disclosure may be exhibited.

BRIEF DESCRIPTION OF DRAWINGS

FIG. 8 is a diagram illustrating example of wide-angle-side color component ratios and determination results according to the first embodiment of the present technology.

FIG. 9 is a diagram illustrating examples of wide-angle-side color components, integration values, and wide-angle-side integration ratios according to the first embodiment of the present technology.

MODE FOR CARRYING OUT THE INVENTION

Hereinafter, modes for implementing the present technology (hereinafter referred to as embodiments) will be described. Description will be given according to the following order.

Figure 1:
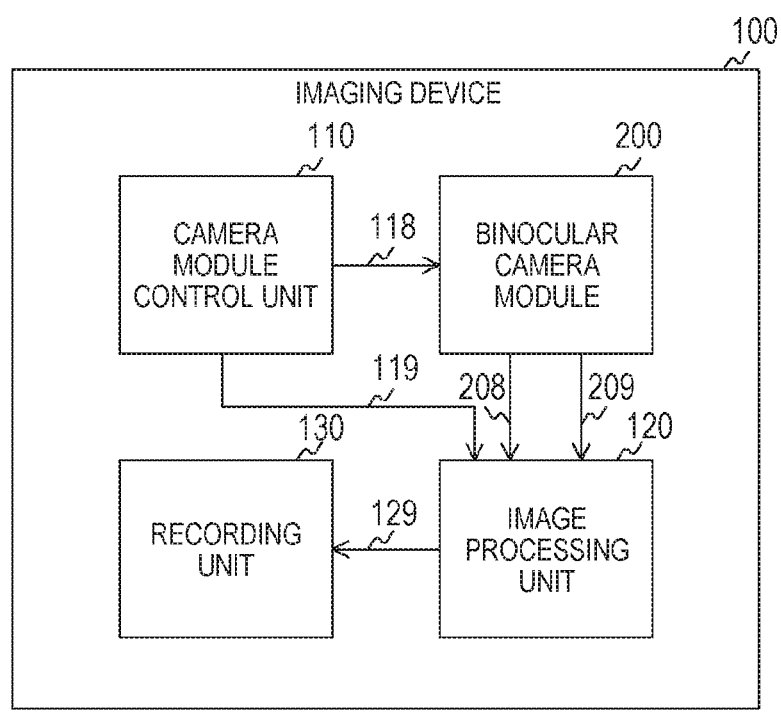
FIG. 1 is a block diagram illustrating a configuration example of an imaging device according to a first embodiment of the present technology.

1. First embodiment (an example of calculating a gain from a wide-angle-side integration ratio and telephoto-side color components)
2. Second embodiment (an example of determining reliability and calculating a gain from a wide-angle-side integration ratio and telephoto-side color components)
3. Third embodiment (an example of calculating a gain from a wide-angle-side integration ratio and telephoto-side color components in a trinocular or more imaging system)
4. Application Example to Mobile Bodies 1. First Embodiment Configuration Example of Imaging Device FIG. 1 is a block diagram illustrating a configuration example of an imaging device 100 according to a first embodiment of the present technology. The imaging device 100 is a device capable of imaging image data, and includes a camera module control unit 110, a binocular camera module 200, an image processing unit 120, and a recording unit 130. As the imaging device 100, a smartphone, a personal computer, or the like having an imaging function is assumed.

The camera module control unit 110 controls the binocular camera module 200 in accordance with an operation of a user. For example, the camera module control unit 110 generates a control signal for controlling imaging in accordance with the operation of the user, and supplies the control signal to the binocular camera module 200 via a signal line 118. Furthermore, the camera module control unit 110 generates a control signal for giving an instruction on a target value of white balance correction according to the operation of the user, and supplies the control signal to the image processing unit 120 via a signal line 119.

The binocular camera module 200 simultaneously images two pieces of image data by two solid-state imaging devices. The binocular camera module 200 supplies the imaged two pieces of image data to the image processing unit 120 via signal lines 208 and 209. The image processing unit 120 performs image processing such as white balance correction for the two pieces of image data. The image processing unit 120 supplies the processed image data to the recording unit 130 via a signal line 129. The recording unit 130 records the image data.

Note that the imaging device 100 records the imaged image data. However, a display unit may be provided and display the image data, or a communication unit may be provided and transmit the image data to the outside.

Configuration Example of Binocular Camera Module

Figure 2A:
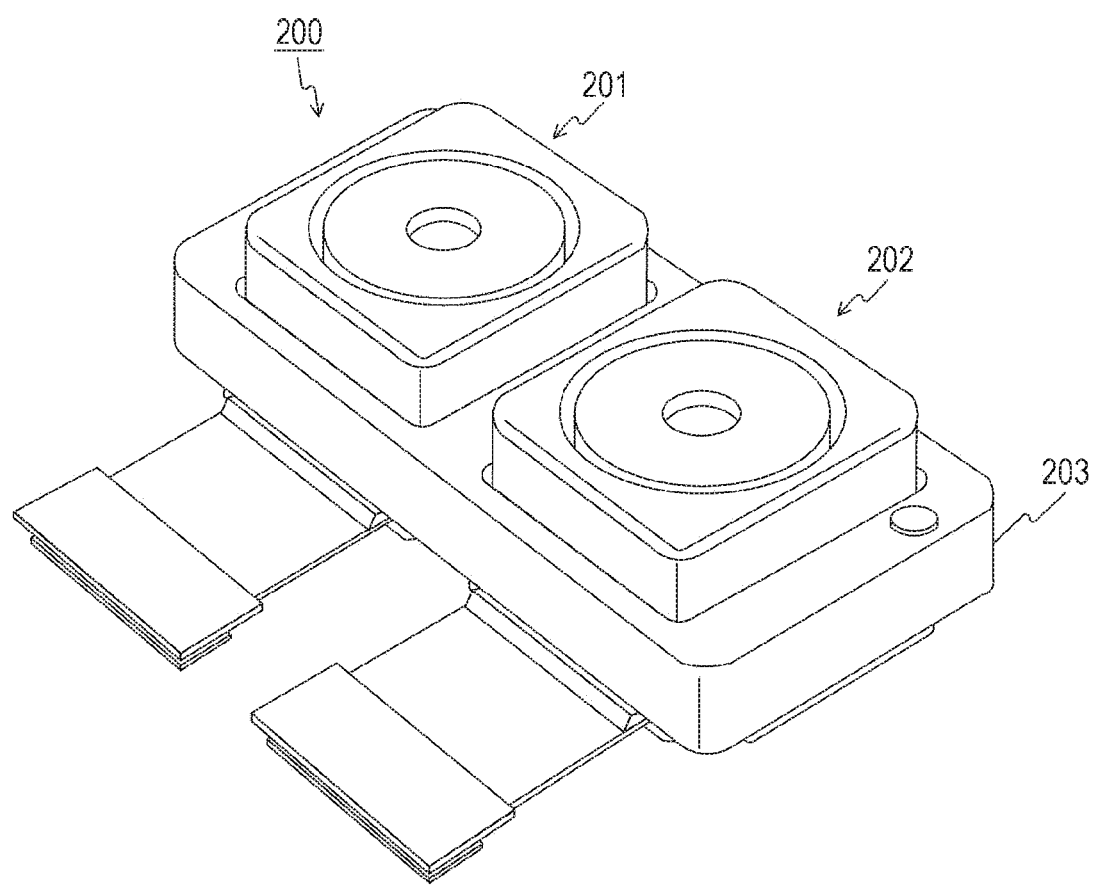
FIGS. 2A and 2B are views illustrating a configuration example of appearance of a binocular camera module according to the first embodiment of the present technology.
Figure 2B:
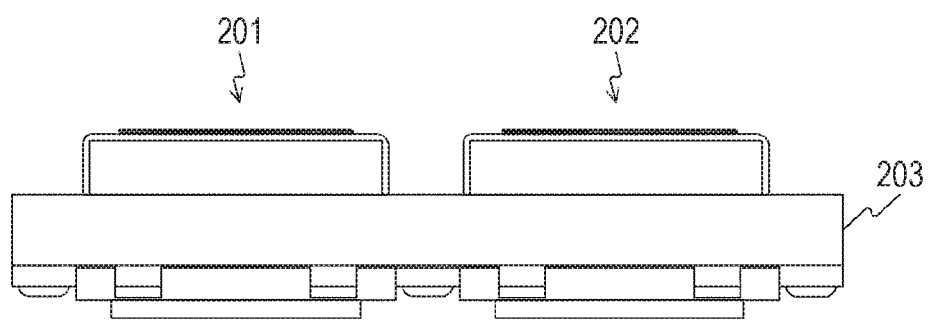

FIGS. 2A and 2B are views illustrating a configuration example of appearance of the binocular camera module according to the first embodiment of the present technology in FIG. 2A is a perspective view of the binocular camera module 200, and FIG. 2B is a front view of the binocular camera module 200.

The binocular camera module 200 is a compound-eye camera module, and is configured such that a monocular camera module 201 and a monocular camera module 202 are secured by a connecting member 203 having a rectangular plate shape.

In the monocular camera module 201, a solid-state imaging device such as a complementary metal oxide semiconductor (CMOS) image sensor, a lens unit, or the like is mounted.

In the monocular camera module 201, the solid-state imaging device includes a pixel unit in which a plurality of pixels is two-dimensionally arrayed, a peripheral circuit unit that drives the pixels and performs analog/digital (A/D) conversion, and the like, for example. In the solid-state imaging device, light (image light) incident through a lens in the lens unit is imaged on a light receiving surface of the pixel unit, and the light of the imaged image is photoelectrically converted to generate a pixel signal.

In the monocular camera module 202, a CMOS image sensor, a lens unit, and the like are mounted similarly to the monocular camera module 201. For example, in the binocular camera module 200, the monocular camera module 202 can be used as a main camera while the monocular camera module 201 can be used as a sub-camera.

The connecting member 203 has a rectangular plate shape having a contour larger than the size in a plane direction when the lens unit of the monocular camera module 201 and the lens unit of the monocular camera module 202 are arranged. Furthermore, in the connecting member 203, a rectangular insertion hole into which the lens unit of the monocular camera module 201 is inserted and a rectangular insertion hole into which the lens unit of the monocular camera module 202 is inserted are symmetrically formed.

In the binocular camera module 200, the lens unit of the monocular camera module 201 and the lens unit of the monocular camera module 202 are respectively inserted and secured in the two rectangular insertion holes formed through the connecting member 203. With the configuration, the binocular camera module 200 is configured as a compound-eye camera module having the monocular camera module 201 and the monocular camera module 202. The binocular camera module 200 is configured as described above.

Note that the monocular camera module 201 and the monocular camera module 202 are an example of a plurality of monocular camera modules connected by the connecting member 203, and hereinafter, in a case where the monocular camera modules are not particularly necessary to be distinguished from each other, the monocular camera modules are simply referred to as monocular camera modules 201.

Furthermore, the monocular camera module is a camera module in which one solid-state imaging device (image sensor) is mounted. Meanwhile, the binocular camera module is a camera module in which two solid-state imaging devices (image sensors) are mounted by connecting two monocular camera modules. Note that the modules may be referred to as other names such as packages.

Figure 3:
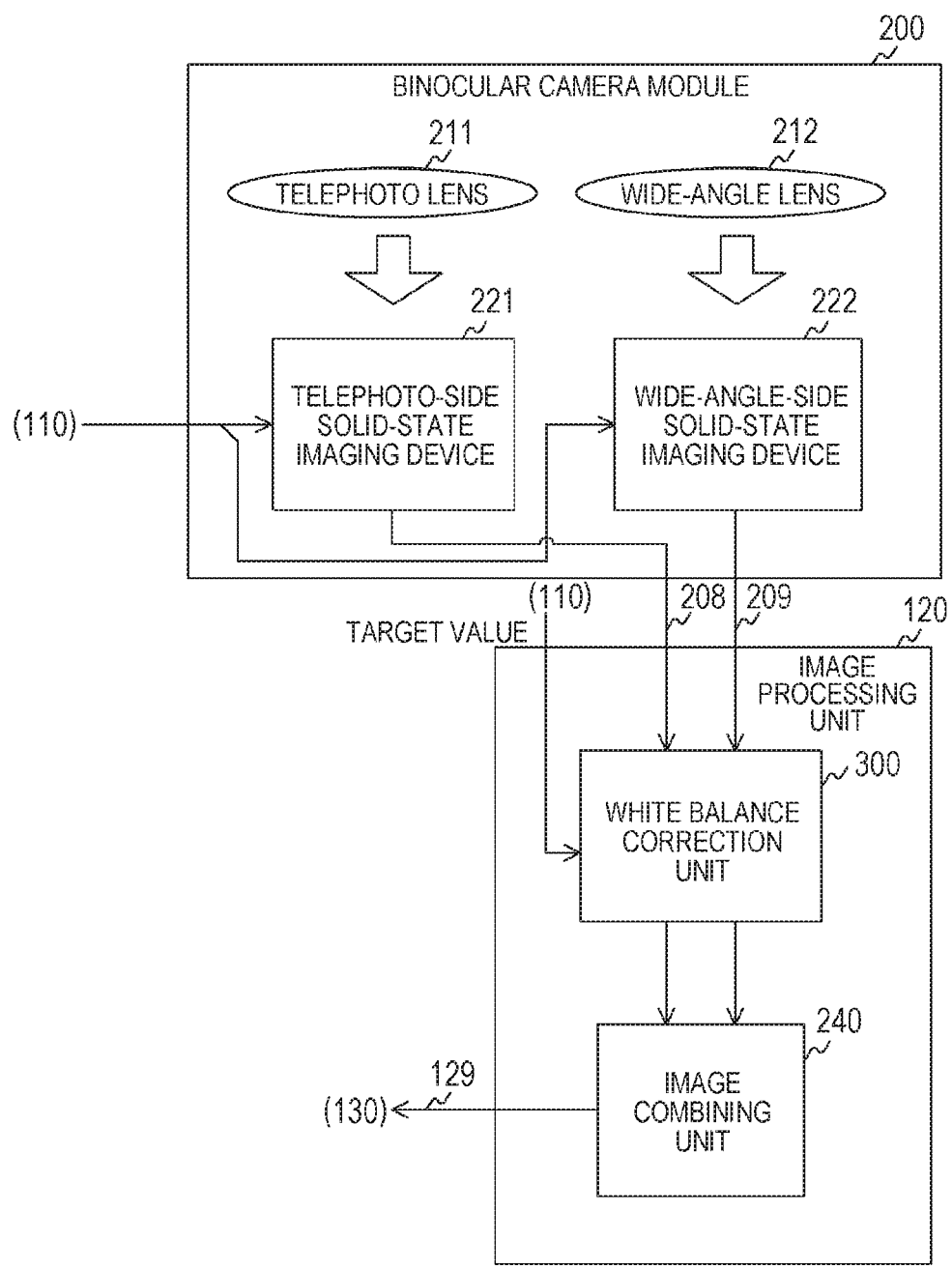
FIG. 3 is a block diagram illustrating a configuration example of the binocular camera module and an image processing unit according to the first embodiment of the present technology.

FIG. 3 is a block diagram illustrating a configuration example of the binocular camera module 200 and the image processing unit 120 according to the first embodiment of the present technology. The binocular camera module 200 includes a telephoto lens 211, a wide-angle lens 212, a telephoto-side solid-state imaging device 221, and a wide-angle-side solid-state imaging device 222. Furthermore, the image processing unit 120 includes a white balance correction unit 300 and an image combining unit 240.

The wide-angle lens 212 and the wide-angle-side solid-state imaging device 222 in FIG. 3 are disposed in the monocular camera module 202 in FIGS. 2A and 2B, and the telephoto lens 211 and the telephoto-side solid-state imaging device 221 in FIG. 3 are disposed in the monocular camera module 201 in FIGS. 2A and 2B.

The telephoto lens 211 is a lens having a narrower angle of view than the wide-angle lens 212, and condenses light from an object and guides the light to the telephoto-side solid-state imaging device 221. As the telephoto lens 211, for example, a single focus lens having a fixed focal length is used.

The wide-angle lens 212 is a lens having a wider angle of view than the telephoto lens 211, and condenses light from an object and guides the light to the wide-angle-side solid-state imaging device 222. As the wide-angle lens 212, for example, a single focus lens having a fixed focal length is used.

The telephoto-side solid-state imaging device 221 images image data under the control of the camera module control unit 110. The image data is data in which pixel data of red (R), green (G), and blue (B) are arrayed in a Bayer array and is also called raw image data. The telephoto-side solid-state imaging device 221 supplies the image data to the white balance correction unit 300 as telephoto image data.

The wide-angle-side solid-state imaging device 222 images image data under the control of the camera module control unit 110. In this image data, R, G, and B pixel data are arrayed in a Bayer array, similarly to the telephoto side. The wide-angle-side solid-state imaging device 222 supplies the image data to the white balance correction unit 300 as wide-angle image data.

Note that the telephoto-side solid-state imaging device 221 and the wide-angle-side solid-state imaging device 222 supply the image data in the Bayer array to the white balance correction unit 300. However, the present invention is not limited to this configuration. For example, a demosaic processing unit can be provided at a front stage of the white balance correction unit 300, and the demosaic processing unit can perform demosaic processing to interpolate missing color information for each pixel and supply the image data after the demosaic processing to the white balance correction unit 300. Furthermore, the demosaic processing may be performed inside or outside the telephoto-side solid-state imaging device 221 and the wide-angle-side solid-state imaging device 222.

Furthermore, the telephoto-side solid-state imaging device 221 and the wide-angle-side solid-state imaging device 222 supply the image data including the R, G, and B color information to the white balance correction unit 300. However, the present invention is not limited to this configuration. For example, a conversion unit can be provided at a front stage of the white balance correction unit 300, and the conversion unit can convert the R, G, and B into a luminance signal Y and color difference signals (U and V, or the like) and supply the image data after the conversion to the white balance correction unit 300. Furthermore, the conversion into the luminance signal and the color difference signals may be performed inside or outside the telephoto-side solid-state imaging device 221 and the wide-angle-side solid-state imaging device 222.

Furthermore, for example, when start of imaging is given in instruction, the camera module control unit 110 generates a vertical synchronization signal of a predetermined frequency (for example, 30 Hz) indicating timing of imaging and supplies the vertical synchronization signal to the telephoto-side solid-state imaging device 221 and the wide-angle-side solid-state imaging device 222. Furthermore, the camera module control unit 110 controls respective exposure times of the telephoto-side solid-state imaging device 221 and the wide-angle-side solid-state imaging device 222 and gains for the pixel signals.

The white balance correction unit 300 performs white balance correction for each of the telephoto image data and the wide-angle image data on the basis of the target value of white balance. The white balance correction unit 300 supplies the telephoto image data and the wide-angle image data after the white balance correction to the image combining unit 240.

The image combining unit 240 combines the wide-angle image data and the telephoto image data as needed. When the user performs an operation to increase zoom magnification to a predetermined value Z1 or higher, the image combining unit 240 selects and outputs the telephoto image data without combining data. Furthermore, when the user performs an operation to decrease the zoom magnification to a predetermined value Z2 or lower, the image combining unit 240 selects and outputs the wide-angle image data. When the user operates the zoom magnification from the predetermined value Z1 to Z2, the image combining unit 240 combines the wide-angle image data and the telephoto image data to generate an image according to the zoom magnification. Then, the image combining unit 240 supplies the combined image data to the recording unit 130.

Figure 4:
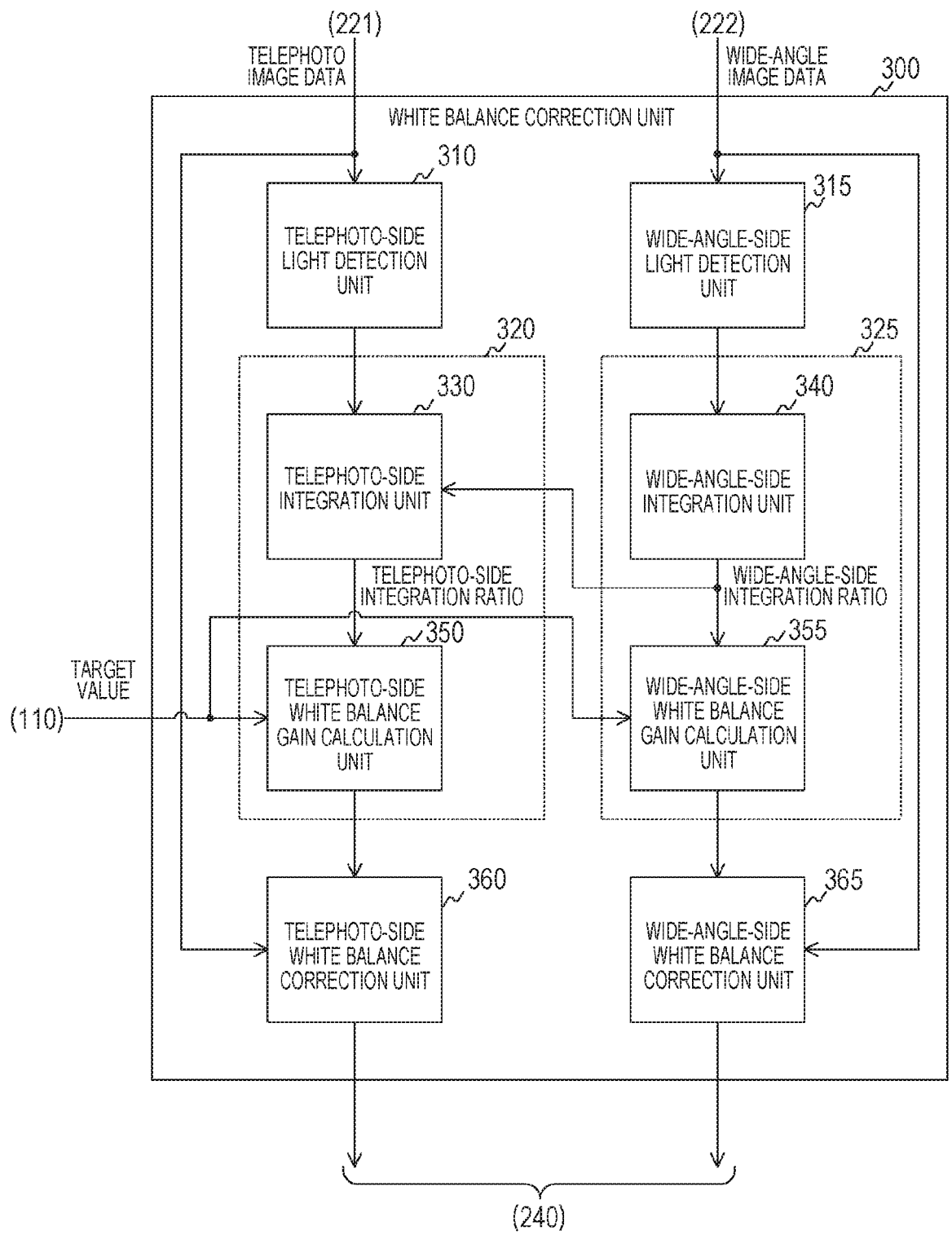
FIG. 4 is a block diagram illustrating a configuration example of a white balance correction unit according to the first embodiment of the present technology.

FIG. 4 is a block diagram illustrating a configuration example of the white balance correction unit 300 according to the first embodiment of the present technology. The white balance correction unit 300 includes a telephoto-side light detection unit 310, a telephoto-side white balance gain acquisition unit 320, and a telephoto-side white balance correction unit 360. Furthermore, the white balance correction unit 300 includes a wide-angle-side light detection unit 315, a wide-angle-side white balance gain acquisition unit 325, and a wide-angle-side white balance correction unit 365.

The wide-angle-side light detection unit 315 detects a plurality of color components in the wide-angle image data. The wide-angle image data is divided into a plurality of wide-angle-side areas, and the wide-angle-side light detection unit 315 detects an R component, a G component, and a B component as color components for each wide-angle-side area. The R component is a total value of R pixel data in the wide-angle-side area, and the G component is a total value of G pixel data in the wide-angle-side area. The B component is a total value of B pixel data in the wide-angle-side area. In a case where the number of wide-angle-side areas is n (n is an integer), n R components, B components, and G components are detected. Then, the wide-angle-side light detection unit 315 normalizes the detected color components, and supplies the normalized color components to the wide-angle-side white balance gain acquisition unit 325 as wide-angle-side color components.

Here, the normalization means processing of adjusting the influence of a difference in optical characteristics between the telephoto-side and wide-angle-side optical systems and a difference in characteristics (sensitivity and the like) between the telephoto-side and wide-angle-side solid-state imaging devices on the color components with a normalization factor.

The wide-angle-side white balance gain acquisition unit 325 obtains a wide-angle-side white balance gain on the basis of the wide-angle-side color components. The wide-angle-side white balance gain acquisition unit includes a wide-angle-side integration unit 340 and a wide-angle-side white balance gain calculation unit 355.

The wide-angle-side integration unit 340 calculates a ratio of respective integration values of the wide-angle-side color components. The wide-angle-side integration unit 340 first calculates a wide-angle-side R/G component ratio and a wide-angle-side B/G component ratio as color component ratios for each wide-angle-side area, using the following expressions.

(The wide-angle-side $R/G$ component ratio)=(the wide-angle-side $R$ components)/(the wide-angle-side $G$ components)

(The wide-angle-side $B/G$ component ratio)=(the wide-angle-side $B$ components)/(the wide-angle-side $G$ components)

Then, the wide-angle-side integration unit 340 determines whether or not the color component ratios of each wide-angle-side area are values within a predetermined wide-angle-side integration range, for the each wide-angle-side area, in an orthogonal coordinate system having R/G and B/G as coordinate axes. Here, the wide-angle-side integration range indicates a range of data used for calculating a white balance gain.

Next, the wide-angle-side integration unit 340 calculates a wide-angle-side R/G integration ratio and a wide-angle-side B/G integration ratio by the following expressions.

(The wide-angle-side $R/G$ integration ratio)=(a wide-angle-side $R$ integration value)/(a wide-angle-side $G$ integration value)

(The wide-angle-side $B/G$ integration ratio)=(a wide-angle-side $B$ integration value)/(the wide-angle-side $G$ integration value)

In the above expression, the "wide-angle-side R integration value" indicates an integration value of the wide-angle-side R components in the wide-angle-side integration range. Furthermore, the "wide-angle-side G integration value" indicates an integration value of the wide-angle-side G components in the wide-angle-side integration range. The "wide-angle-side B integration value" indicates an integration value of the wide-angle-side B components in the wide-angle-side integration range.

The wide-angle-side integration unit 340 supplies the wide-angle-side R/G integration ratio and the wide-angle-side B/G integration ratio to the wide-angle-side white balance gain calculation unit 355 and the telephoto-side white balance gain acquisition unit 320 as a wide-angle-side integration ratio.

The wide-angle-side white balance gain calculation unit 355 calculates a white balance gain on the basis of the wide-angle-side integration ratio and target values. As the target values, for example, an R/G target value for the R/G integration ratio and a B/G target value for the B/G integration ratio are set on the basis of a color temperature of a desired light source. The wide-angle-side white balance gain calculation unit 355 calculates a quotient obtained by dividing the R/G target value by the wide-angle-side R/G integration ratio as an R gain for the R pixel data. Furthermore, the wide-angle-side white balance gain calculation unit 355 calculates a quotient obtained by dividing the B/G target value by the wide-angle-side B/G integration ratio as a B gain for the B pixel data. For example, in a case where the R/G target value is "1" and the wide-angle-side R/G integration ratio is "1/2", "2" is calculated as the R gain. Note that not only the R gain and the B gain are calculated but also the G gain may be calculated.

Then, the wide-angle-side white balance gain calculation unit 355 inversely normalizes the R gain and the B gain, and supplies the inversely normalized R gain and B gain to the wide-angle-side white balance correction unit 365 as wide-angle-side white balance gains.

The wide-angle-side white balance correction unit 365 corrects wide-angle image data with the wide-angle-side white balance gains. The wide-angle-side white balance correction unit 365 corrects the R pixel data in the wide-angle image data with the R gain and corrects the B pixel data with the B gain. Then, the wide-angle-side white balance correction unit 365 supplies the wide-angle image data after the correction to the image combining unit 240.

The telephoto-side light detection unit 310 detects a plurality of color components in telephoto image data. The telephoto image data is divided into a plurality of telephoto-side areas, and the telephoto-side light detection unit 310 detects an R component, a G component, and a B component as color components for each telephoto-side area. Then, the telephoto-side light detection unit 310 normalizes the detected color components, and supplies the normalized color components to the telephoto-side white balance gain acquisition unit 320 as telephoto-side color components.

The telephoto-side white balance gain acquisition unit 320 obtains a telephoto-side white balance gain on the basis of the telephoto-side color components and the wide-angle-side integration ratio. The telephoto-side white balance gain acquisition unit includes a telephoto-side integration unit 330 and a telephoto-side white balance gain calculation unit 350.

The telephoto-side integration unit 330 calculates a ratio of respective integration values of the telephoto-side color components. The telephoto-side integration unit 330 first calculates a telephoto-side R/G component ratio and a telephoto-side B/G component ratio as color component ratios for each telephoto-side area, using the following expressions.

(The telephoto-side $R/G$ component ratio)=(a telephoto-side $R$ component)/(a telephoto-side $G$ component)

(The telephoto-side $B/G$ component ratio)=(a telephoto-side $B$ component)/(the telephoto-side $G$ component)

Furthermore, the telephoto-side integration unit 330 sets a predetermined range centered on the wide-angle-side integration ratio as a telephoto-side integration range in the orthogonal coordinate system having R/G and B/G as coordinate axes Then, the telephoto-side integration unit 330 determines whether or not the color component ratios corresponding to each telephoto-side area are values within the telephoto-side integration range, for the each telephoto-side area.

Next, the telephoto-side integration unit 330 calculates a telephoto-side R/G integration ratio and a telephoto-side B/G integration ratio by the following expressions.

(The telephoto-side $R/G$ integration ratio)=(a telephoto-side $R$ integration value)/(a telephoto-side $G$ integration value)

(The telephoto-side $B/G$ integration ratio)=(a telephoto-side $B$ integration value)/(the telephoto-side $G$ integration value)

In the above expression, the "telephoto-side R integration value" indicates an integration value of the telephoto-side R components in the telephoto-side integration range. Furthermore, the "telephoto-side G integration value" indicates an integration value of the telephoto-side G components in the telephoto-side integration range. The "telephoto-side B integration value" indicates an integration value of the telephoto-side B components in the telephoto-side integration range.

The telephoto-side integration unit 330 supplies the telephoto-side R/G integration ratio and the telephoto-side B/G integration ratio to the telephoto-side white balance gain calculation unit 350 as telephoto-side integration ratios.

The telephoto-side white balance gain calculation unit 350 calculates a white balance gain on the basis of the telephoto-side integration ratios and target values. The telephoto-side white balance gain calculation unit 350 obtains and inversely normalizes the R gain and the B gain by an operation similar to the wide-angle-side white balance gain calculation unit 355, and supplies the inversely normalized R gain and B gain to the telephoto-side white balance correction unit 360 as telephoto-side white balance gains.

The telephoto-side white balance correction unit 360 corrects the telephoto image data with the telephoto-side white balance gains. The telephoto-side white balance correction unit 360 supplies the telephoto image data after the correction to the image combining unit 240.

Figure 5A:
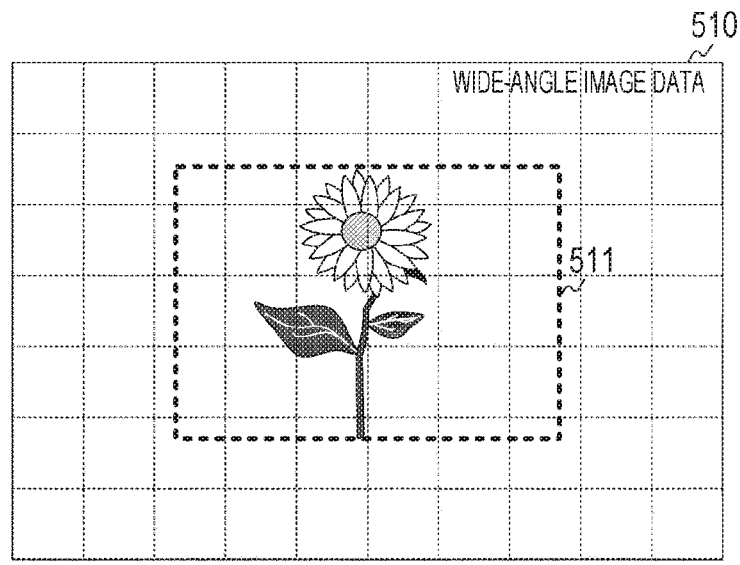
FIGS. 5A and 5B are diagrams illustrating examples of wide-angle image data and telephoto image data according to the first embodiment of the present technology.
Figure 5B:
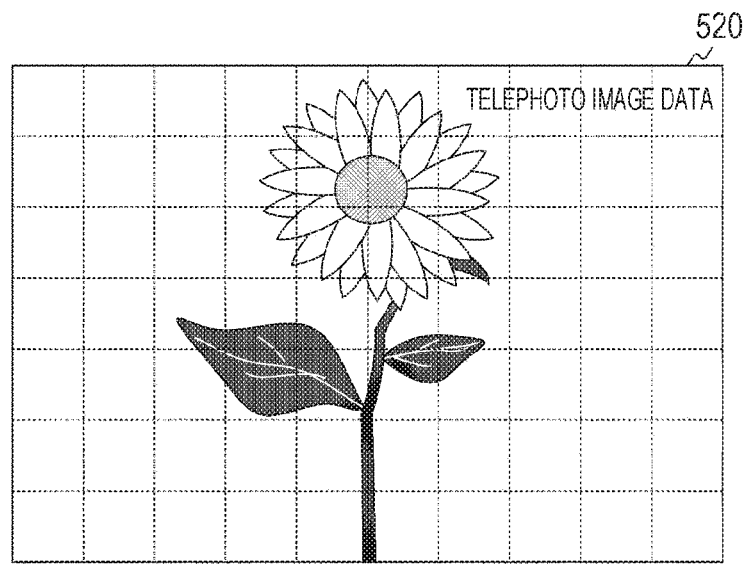

FIGS. 5A and 5B are diagrams illustrating examples of the wide-angle image data and the telephoto image data according to the first embodiment of the present technology in FIG. 5A illustrates an example of wide-angle image data 510 and FIG. 5B illustrates an example of telephoto image data 520.

The wide-angle image data 510 is divided into a plurality of rectangular wide-angle-side areas, as illustrated in FIG. 5A. Each of the areas surrounded by the thin dotted line in the wide-angle image data 510 indicates a wide-angle-side area. Furthermore, an area 511 in the wide-angle image data 510 is a region corresponding to the telephoto image data 520.

Furthermore, the telephoto image data 520 is also divided into a plurality of rectangular telephoto-side areas, as illustrated in FIG. 5B. Each of the areas surrounded by the thin dotted line in the telephoto image data 520 indicates a telephoto-side area.

Here, an imaging device of a comparative example, which calculates telephoto-side white balance gains from only telephoto-side color components while calculating wide-angle-side white balance gains from only wide-angle-side color components, is assumed. In a configuration to individually calculate the white balance gains on the wide-angle side and on the telephoto side, as described above, the color tone of an object on the telephoto side may deviate from the color tone under a desired light source. This is because, in the wide-angle image data 510, not only the color components of the area 511 but also color components of areas other than the area 511 are detected, whereas in the telephoto image data 520, the color components can be detected only from a portion corresponding to the area 511.

For example, it is assumed that the area 511 in the wide-angle image data 510 is bluish and the periphery is reddish, and the balance of R, G, and B of the whole image is close to the target value. In the comparative example in which the white balance gains are individually calculated on the wide-angle side and the telephoto side, the imaging device rarely performs correction because the wide-angle side is balanced, whereas on the telephoto side, the imaging device performs correction by increasing the R gain because the entire areas are bluish. As a result, on the telephoto side, the color tone of the object becomes unnatural compared to the wide-angle side, and the accuracy of the white balance correction decreases.

In contrast, the white balance correction unit 300 sets the telephoto-side integration range centered on the wide-angle-side integration ratio, and calculates the telephoto-side white balance gains on the basis of the telephoto-side color components in the range. With the configuration, the telephoto-side integration ratio can be narrowed down to a value close to the wide-angle-side integration ratio, and the accuracy of the white balance correction on the telephoto-side can be improved.

Note that it is conceivable to apply the wide-angle-side white balance gains to the telephoto side as they are. However, this method cannot sufficiently improve the accuracy of the white balance correction on the telephoto side. This is because the characteristics of the optical systems on the wide-angle side and the telephoto side are different, and furthermore, the characteristics (sensitivity and the like) of the solid-state imaging devices are different. A method of obtaining coefficients for correcting the characteristic differences in advance and correcting the telephoto-side white balance gains with the coefficients is conceivable. However, correction of various light sources with the same coefficients is difficult. Even if the coefficients are set for each light source, an extremely large number of coefficients need to be stored in a memory or the like, and appropriate correction is difficult.

Configuration Example of Wide-Angle-Side Integration Unit

Figure 6:
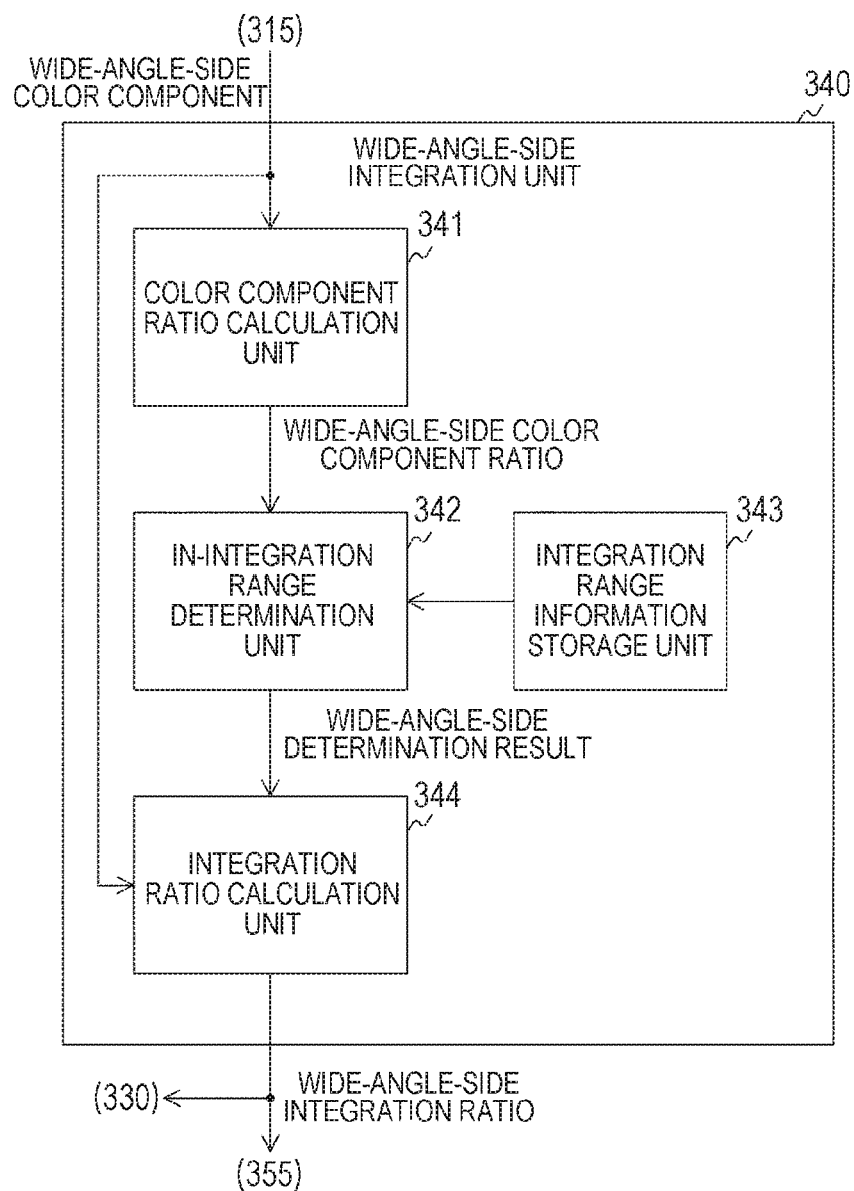
FIG. 6 is a block diagram illustrating a configuration example of a wide-angle-side integration unit according to the first embodiment of the present technology.

FIG. 6 is a block diagram illustrating a configuration example of the wide-angle-side integration unit 340 according to the first embodiment of the present technology. The wide-angle-side integration unit 340 includes a color component ratio calculation unit 341, an in-integration range determination unit 342, an integration range information storage unit 343, and an integration ratio calculation unit 344.

The color component ratio calculation unit 341 calculates the wide-angle-side R/G component ratio and the wide-angle-side B/G component ratio for each wide-angle-side area and supplies the calculated result to the in-integration range determination unit 342.

The integration range information storage unit 343 stores information indicating the wide-angle-side integration range. The in-integration range determination unit 342 acquires the wide-angle-side integration range from the integration range information storage unit 343, and determines whether or not the color component ratios fall within the wide-angle-side integration range for each wide-angle-side area. The integration range information storage unit 343 supplies the determination result to the integration ratio calculation unit 344.

The integration ratio calculation unit 344 calculates the wide-angle-side R/G integration ratio and the wide-angle-side B/G integration ratio from the color components of the wide-angle-side areas corresponding to the color component ratios within the wide-angle-side integration range. The integration ratio calculation unit 344 supplies the calculation result to the wide-angle-side white balance gain calculation unit 355 and the telephoto-side integration unit 330.

Configuration Example of Telephoto-Side Integration Unit

Figure 7:
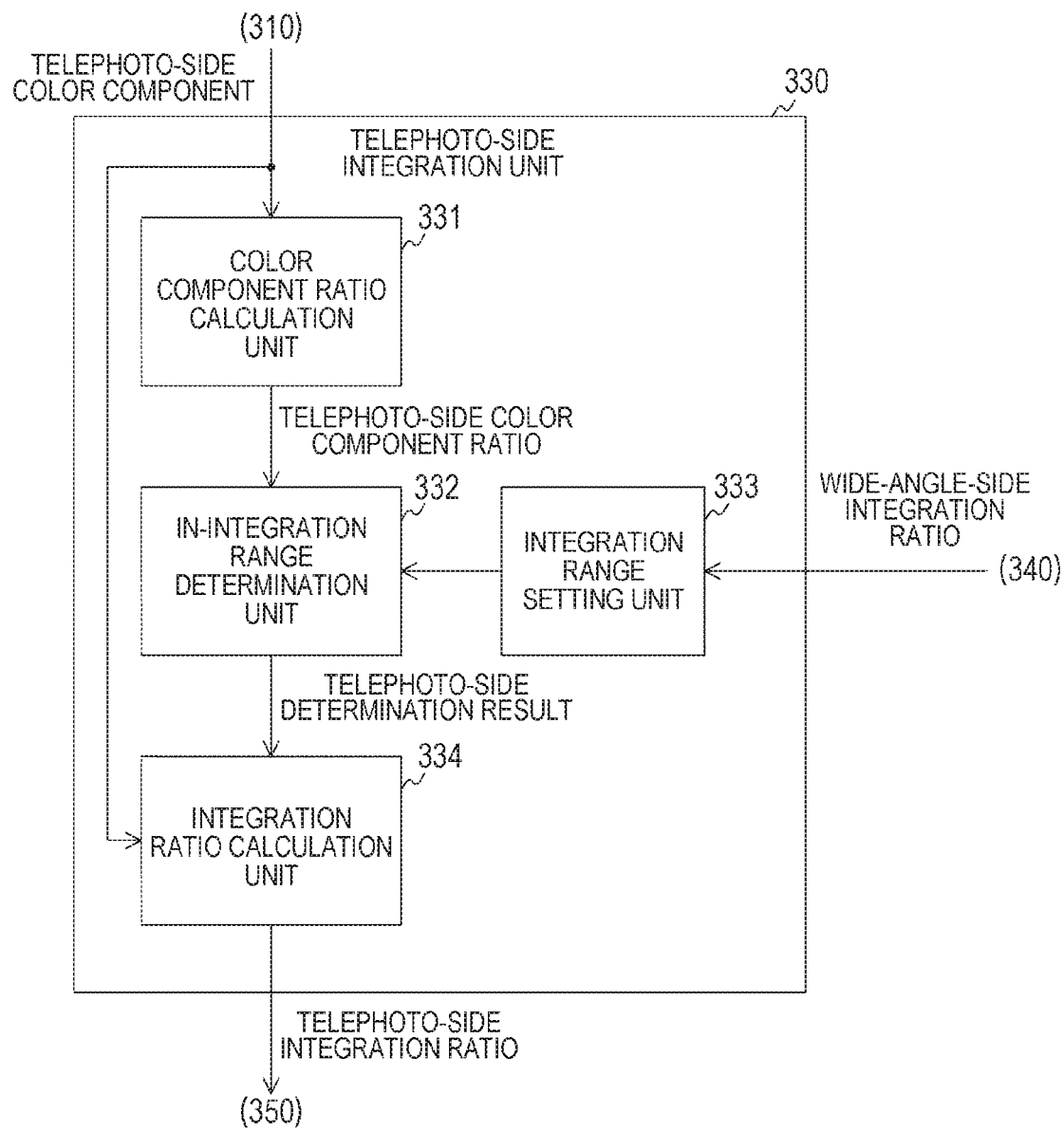
FIG. 7 is a block diagram illustrating a configuration example of a telephoto-side integration unit according to the first embodiment of the present technology.

FIG. 7 is a block diagram illustrating a configuration example of the telephoto-side integration unit 330 according to the first embodiment of the present technology. The telephoto-side integration unit 330 includes a color component ratio calculation unit 331, an in-integration range determination unit 332, an integration range setting unit 333, and an integration ratio calculation unit 334.

The color component ratio calculation unit 331 calculates the telephoto-side R/G component ratio and the telephoto-side B/G component ratio for each telephoto-side area and supplies the calculation result to the in-integration range determination unit 332.

The integration range setting unit 333 sets a predetermined range centered on the wide-angle-side integration ratio as the telephoto-side integration range. The in-integration range determination unit 332 acquires the set telephoto-side integration range and determines whether or not the color component ratios fall within the telephoto-side integration range for each telephoto-side area. The in-integration range determination unit 332 supplies the determination result to the integration ratio calculation unit 334.

The integration ratio calculation unit 334 calculates the telephoto-side R/G integration ratio and the telephoto-side B/G integration ratio from the color components of the telephoto-side areas corresponding to the color component ratios within the telephoto-side integration range. The integration ratio calculation unit 334 supplies the calculation result to the telephoto-side white balance gain calculation unit 350.

FIG. 8 is a diagram illustrating examples of the wide-angle-side color component ratios and determination results according to the first embodiment of the present technology. It is assumed that area identification information "A0" to "An" is assigned to the n wide-angle-side areas. It is assumed that, in the wide-angle-side area of "A0", for example, the wide-angle-side R component, the wide-angle-side G component, and the wide-angle-side B component are "10", "20", and "20", respectively. In this case, the wide-angle-side color component ratio calculation unit 341 calculated "1/2" as the wide-angle-side R/G component ratio of "A0" and "1" as the wide-angle-side B/G component ratio of "A0".

Furthermore, the wide-angle-side in-integration range determination unit 342 determines whether or not the color component ratios fall within the wide-angle-side integration range for each wide-angle-side area. For example, "1" is set to the determination result in a case where the color component ratios fall within the integration range, and "0" is set in a case where the color component ratios falls outside the integration range.

FIG. 9 is a diagram illustrating examples of the wide-angle-side color components, the integration values, and the wide-angle-side integration ratio according to the first embodiment of the present technology. The integration ratio calculation unit 344 calculates the wide-angle-side R/G integration ratio and the wide-angle-side B/G integration ratio from the color components of the wide-angle-side areas with the determination result of "1". For example, it is assumed that the determination result of "A0" is "0" (outside the integration range) and the determination results of "A1" and "An" are "1" (within the integration range). In this case, the integration ratio calculation unit 344 integrates the R component, the B component, and G component of "A1" and "An" with the determination result of "1", respectively, to obtain an R integration value, a G integration value, and a B integration value. Then, the integration ratio calculation unit 344 calculates the wide-angle-side R/G integration ratio from the R integration value and the G integration value, and calculates the wide-angle-side B/G integration ratio from the B integration value and the G integration value.

Figure 10A:
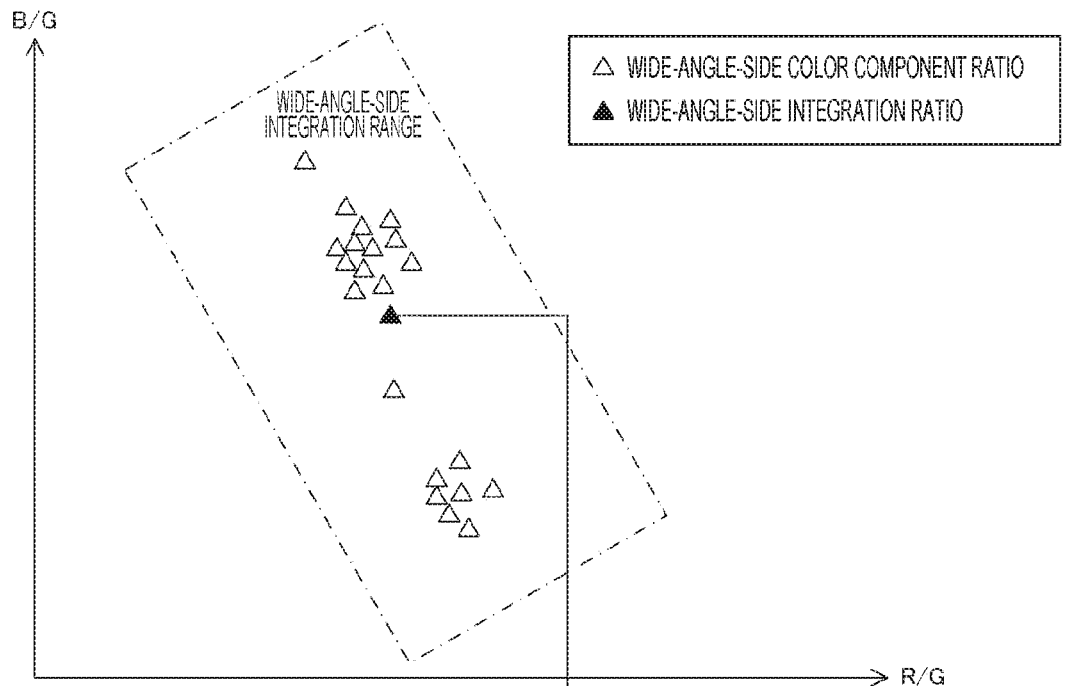
FIGS. 10A and 10B are examples of scatter diagrams in which data of wide-angle-side color component ratios and data of telephoto-side color component ratios according to the first embodiment of the present technology are plotted.
Figure 10B:
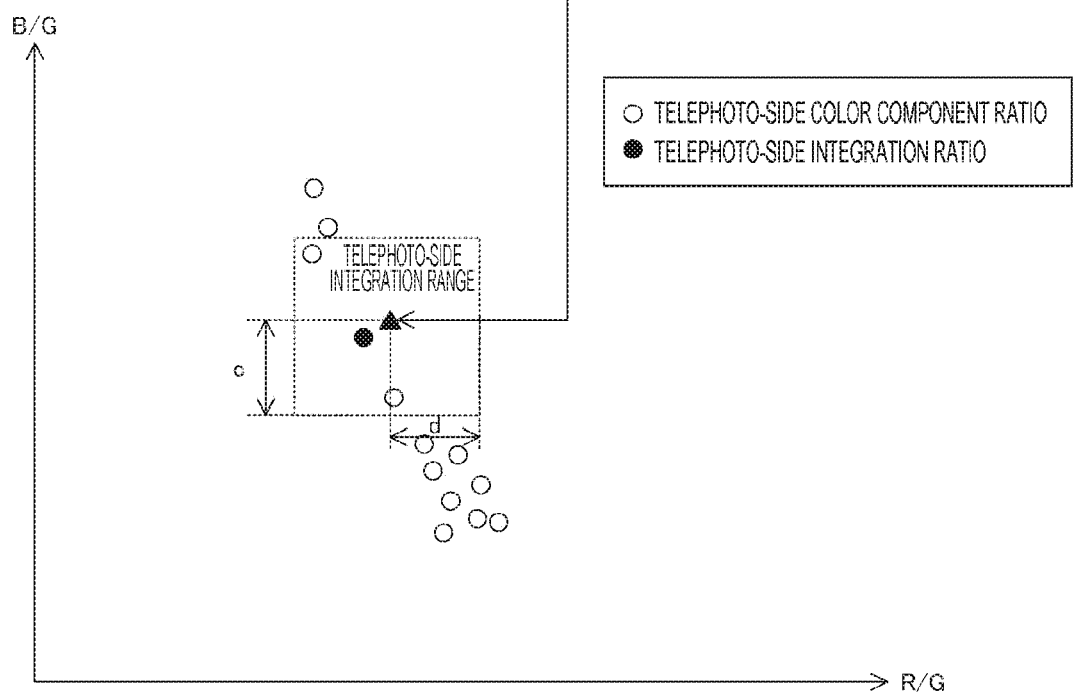

FIGS. 10A and 10B are examples of scatter diagrams in which data of the wide-angle-side color component ratios and data of the telephoto-side color component ratios according to the first embodiment of the present technology are plotted in FIG. 10A is a scatter diagram in which data of the wide-angle-side color component ratios is plotted, and FIG. 10B is a scatter diagram in which data of the telephoto-side color component ratios is plotted. The vertical axes represents B/G and the horizontal axes represent R/G in FIGS. 10A and 10B. A white triangle is a plot of the color component ratio of each wide-angle-side area. The black triangle is a plot of the wide-angle-side integration ratio. A white circle is a plot of the color component ratio of each telephoto area. The black circle is a plot of the telephoto-side integration ratio. Furthermore, the range surrounded by the one-dot chain line represents the wide-angle-side integration range, and the range surrounded by the dotted line represents the telephoto-side integration range.

Note that the differences in the optical characteristics and the solid-state imaging devices on the wide-angle side and the telephoto side have been adjusted by normalization.

The wide-angle-side integration unit 340 determines whether or not each of the white triangle plots falls within the wide-angle-side integration range, and calculates the wide-angle-side integration ratio from the plots in the wide-angle-side integration range. Then, the wide-angle-side integration unit 340 supplies the wide-angle-side integration ratio to the telephoto-side integration unit 330.

Then, the telephoto-side integration unit 330 sets a range having a predetermined shape (for example, rectangle) centered on the wide-angle-side integration ratio as the telephoto-side integration range in the orthogonal coordinate system. Furthermore, a side of the telephoto-side integration range is parallel to the coordinate axis, and the telephoto-side integration range are set in position and size so as not to go beyond the wide-angle-side integration range. Furthermore, values adjusted in advance according to performance evaluation are set to distances (c and d) to respective sides from the center of the telephoto-side integration range. The telephoto-side integration unit 330 calculates the telephoto-side integration ratio from plots within the set telephoto-side integration range.

Figure 11:
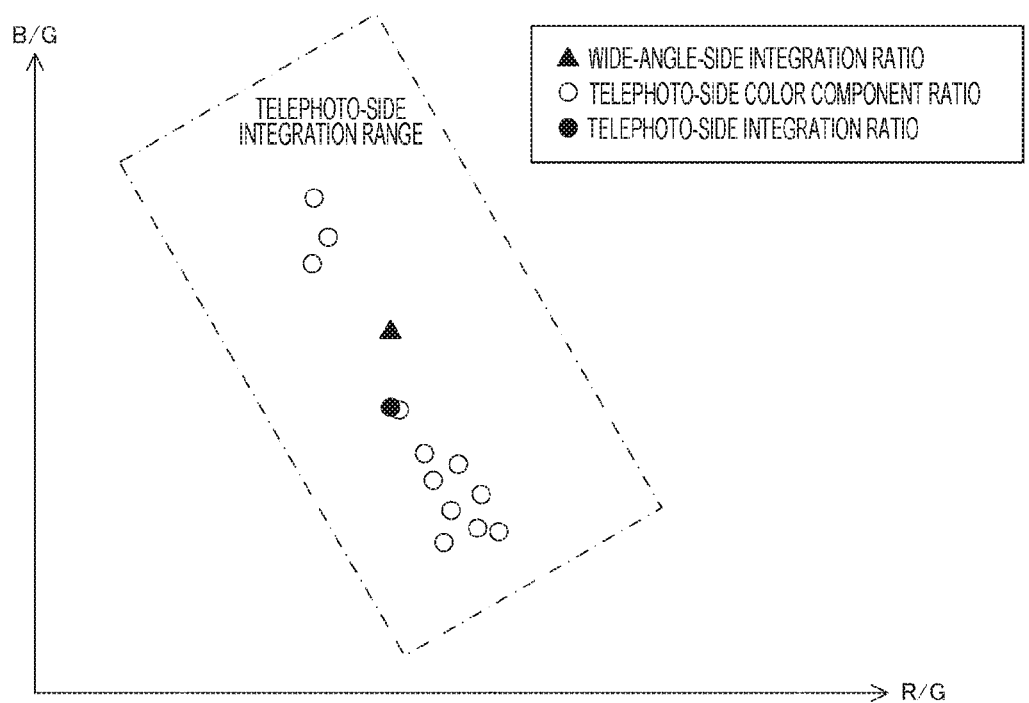
FIG. 11 is an example of a scatter diagram in which data of telephoto-side color component ratios in a comparative example is plotted.

FIG. 11 is an example of a scatter diagram in which data of telephoto-side color component ratios are plotted in the comparative example of individually calculating the white balance gains on the telephoto side and the wide-angle side. The vertical axes represents B/G and the horizontal axes represent R/G in FIG. 11. The black triangle is a plot of the wide-angle-side integration ratio. A white circle is a plot of the color component ratio of each telephoto area. The black circle is a plot of the telephoto-side integration ratio. Furthermore, a range surrounded by the one-dot chain line indicates the telephoto-side integration range.

In the comparative example, a constant telephoto-side integration range is set regardless of the wide-angle-side integration ratio. The imaging device of the comparative example integrates, on the wide-angle side, the plotted color components within the telephoto-side integration range to calculate the telephoto-side integration ratio, similarly to the telephoto side.

As illustrated in FIG. 11, in the comparative example, the telephoto-side integration ratio may be a value significantly different from the wide-angle-side integration ratio. As a result, the accuracy of the white balance correction on the telephoto side is decreased. This is because, as described above, on the wide-angle side, the color components of the entire object can be detected, whereas on the telephoto side, only part of the components of the object can be detected.

In contrast, the telephoto-side integration unit 330 calculates the telephoto-side integration ratio using the wide-angle-side integration ratio in addition to the telephoto-side color components. Therefore, the telephoto-side integration ratio becomes a value close to the wide-angle-side integration ratio, as illustrated in FIGS. 10A and 10B. Thereby, the accuracy of the white balance correction on the telephoto side can be improved.

Operation Example of Imaging Device

Figure 12:
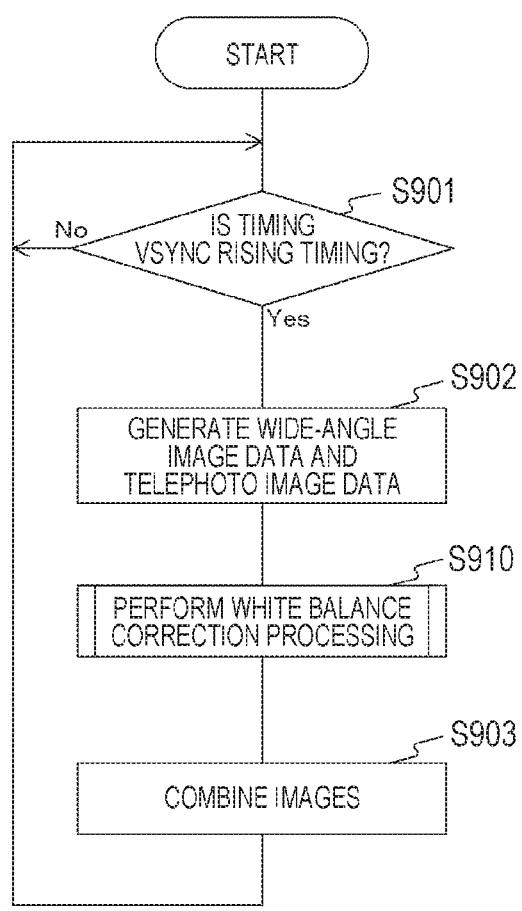
FIG. 12 is a flowchart illustrating an example of an operation of the imaging device according to the first embodiment of the present technology.

FIG. 12 is a flowchart illustrating an example of an operation of the imaging device 100 according to the first embodiment of the present technology. This operation is started when, for example, an application for capturing an image is executed. The imaging device 100 determines whether or not timing is rising timing of a vertical synchronization signal VSYNC (step S901). In a case where the timing is not the rising timing of the vertical synchronization signal VSYNC (step S901: No), the imaging device 100 repeats step S901.

On the other hand, in a case where the timing is the rising timing of the vertical synchronization signal VSYNC (step S901: Yes), the imaging device 100 generates the wide-angle image data and the telephoto image data (step S902). Then, the imaging device 100 executes white balance correction processing for performing white balance correction for the image data (step S910). Next, the imaging device 100 combines the image data according to the zoom magnification (step S903) and repeatedly executes step S901 and the subsequent steps.

Figure 13:
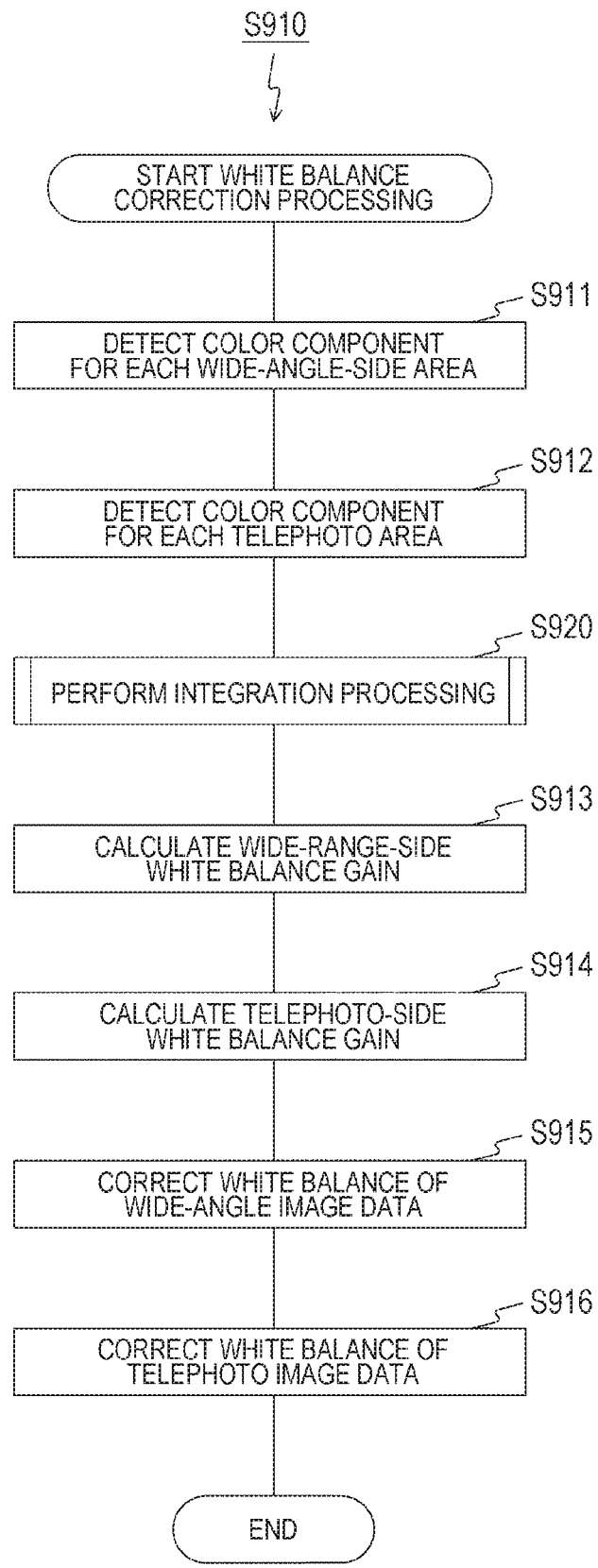
FIG. 13 is a flowchart illustrating an example of white balance correction processing according to the first embodiment of the present technology.

FIG. 13 is a flowchart illustrating an example of white balance correction processing according to the first embodiment of the present technology. The white balance correction unit 300 detects the R, G, and B color components for each wide-angle-side area (step S911), and detects the R, G, and B color components for each telephoto-side area (step S912).

Then, white balance correction unit 300 performs integration processing for obtaining the integration ratios (step S920). Next, the white balance correction unit 300 calculates the wide-angle-side white balance gain on the basis of the wide-angle-side integration ratio and the target value (step S913), and calculates the telephoto-side white balance gain on the basis of the telephoto-side integration ratio and the target value (step S914).

The white balance correction unit 300 corrects the wide-angle image data with the wide-angle-side white balance gain (step S915), and corrects the telephoto image data with the telephoto-side white balance gain (step S916). After step S916, the white balance correction unit 300 terminates the white balance correction processing.

Figure 14:
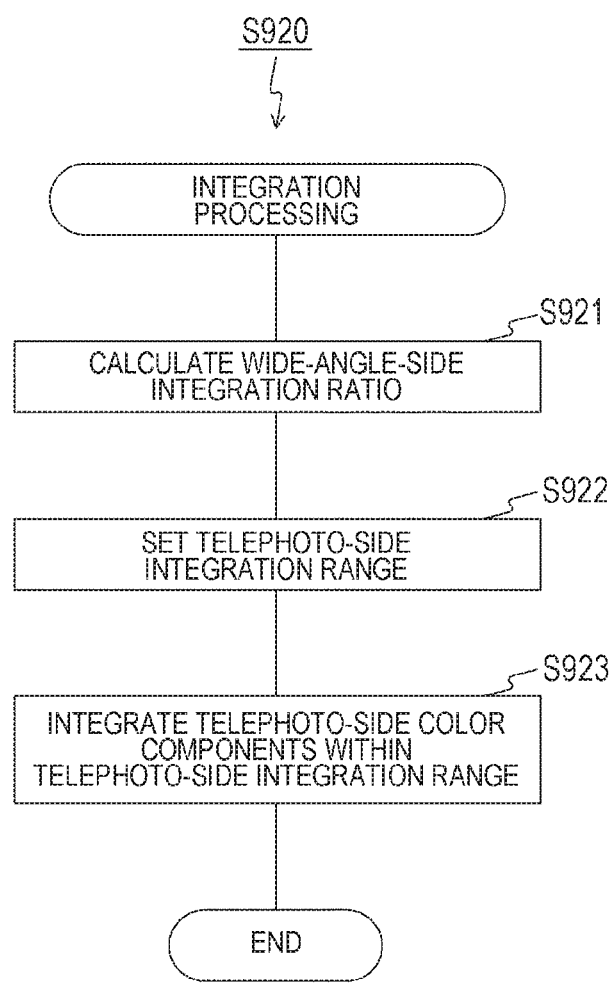
FIG. 14 is a flowchart illustrating an example of integration processing according to the first embodiment of the present technology.

FIG. 14 is a flowchart illustrating an example of the integration processing according to the first embodiment of the present technology. The white balance correction unit 300 performs integration within the wide-angle-side integration range to calculate the wide-angle-side integration ratio (step S921). Then, the white balance correction unit 300 sets the telephoto-side integration range centered on the wide-angle-side integration ratio (step S922), and integrates the color components on the telephoto side within the telephoto-side integration range to calculate the telephoto-side integration ratio (step S923). After step S923, the white balance correction unit 300 terminates the integration processing.

As described above, according to the first embodiment of the present technology, the imaging device 100 obtains the gain according to the telephoto-side integration ratio on the basis of the wide-angle-side integration ratio and the telephoto-side color components, thereby obtaining a more appropriate telephoto-side gain close to the wide-angle side than the case of using only the telephoto-side color components. By using the appropriate gain in the white balance correction, the accuracy of the telephoto-side white balance correction can be improved.

First Modification

In the above-described first embodiment, the white balance correction unit 300 has set the rectangular integration range centered on the wide-angle-side integration ratio. However, if the integration range is rectangular, the distance from the center (wide-angle-side integration ratio) to the boundary (to the sides and vertexes) of the integration range is not constant. If the distances to the sides are set to be appropriate, unnecessary plots become calculation targets in the distances from the center to the vertexes. As a result, there is a possibility that the correction accuracy cannot be sufficiently improved. An imaging device 100 according to a first modification of the first embodiment is different from the first embodiment in setting an integration range in which a distance from a center to a boundary is constant.

Figure 15A:
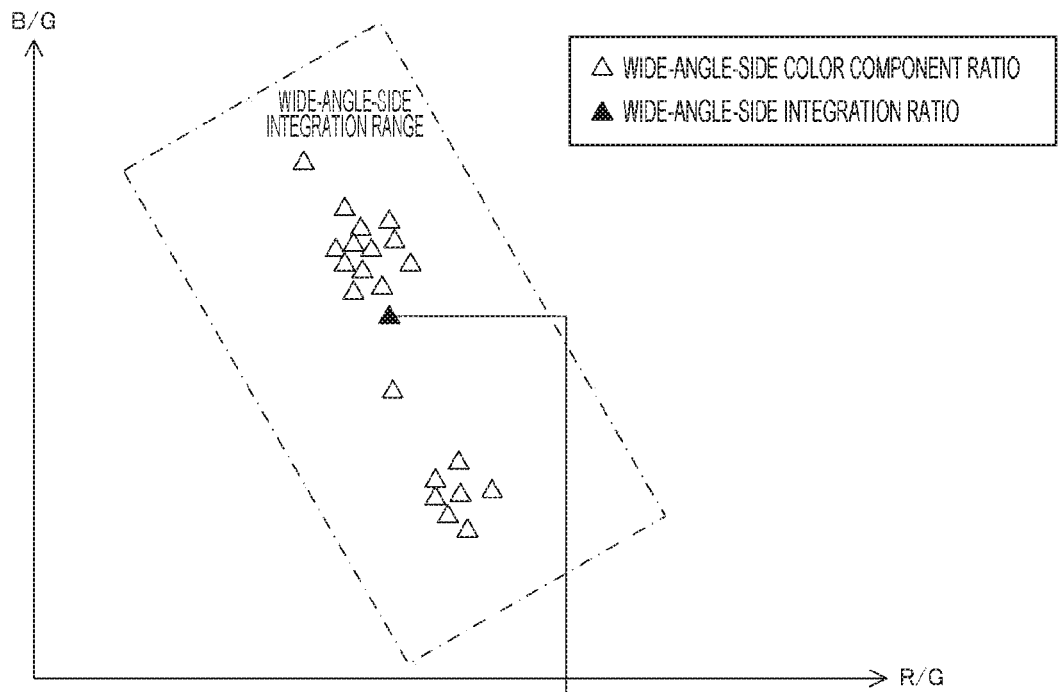
FIGS. 15A and 15B are diagrams illustrating an example of a shape of a telephoto-side integration range according to a first modification of the first embodiment of the present technology.
Figure 15B:
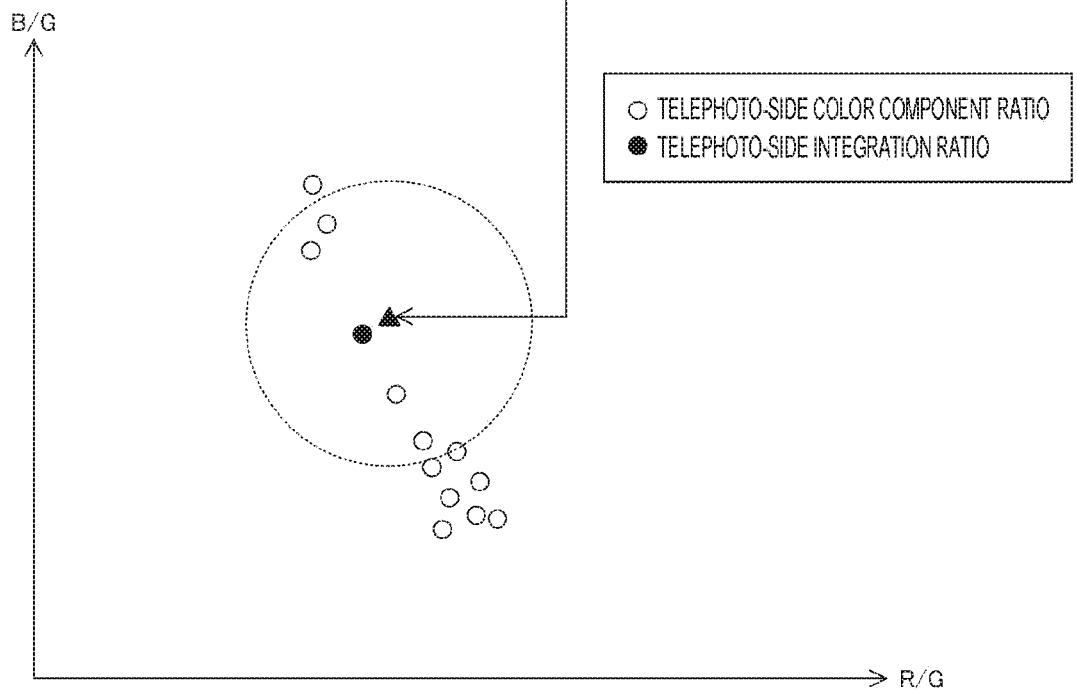

FIGS. 15A and 15B are diagrams illustrating an example of the shape of the telephoto-side integration range according to the first modification of the first embodiment of the present technology in FIG. 15A is a scatter diagram in which data of wide-angle-side color component ratios is plotted, and FIG. 15B is a scatter diagram in which data of telephoto-side color component ratios is plotted. As illustrated in FIG. 15B, a white balance correction unit 300 sets a circular range centered on a wide-angle-side integration ratio as the telephoto-side integration range. Furthermore, a value in which the telephoto-side integration range does not go beyond the wide-angle-side integration range is set to a radius of the circle.

Note that the shape of the integration range is not limited to the circle and may be an ellipse. By setting an ellipse, a permissible amount in a long-axis (R/G or the like) direction can be made larger than a permissible amount in a short-axis (B/G or the like) direction.

As described above, in the first modification of the first embodiment of the present technology, the imaging device 100 sets the circular telephoto-side integration range centered on the wide-angle-side integration ratio, thereby making the distance from the center constant. Thereby, the accuracy of white balance correction can be improved.

Second Modification

In the above-described first embodiment the white balance correction unit 300 has set the rectangular telephoto-side integration range with the sides parallel to the coordinate axes. However, if the distances c and d from the center are set to be large, there is a possibility that the telephoto-side integration range goes beyond the wide-angle-side integration range. To make the distances c and d from the center be large, the white balance correction unit 300 is only required to set a telephoto-side integration range with sides parallel to the wide-angle-side integration range. An imaging device 100 according to a second modification of the first embodiment is different from the first embodiment in setting a telephoto-side integration range having sides parallel to a wide-angle-side integration range.

Figure 16A:
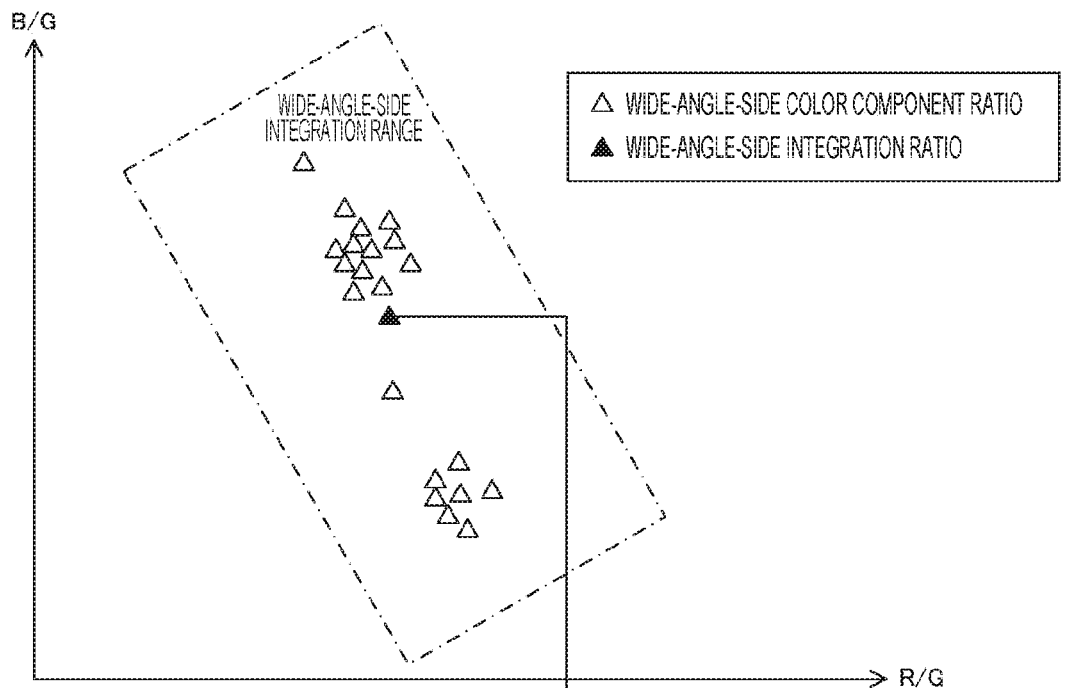
FIGS. 16A and 16B are diagrams illustrating an example of a shape of a telephoto-side integration range according to a second modification of the first embodiment of the present technology.
Figure 16B:
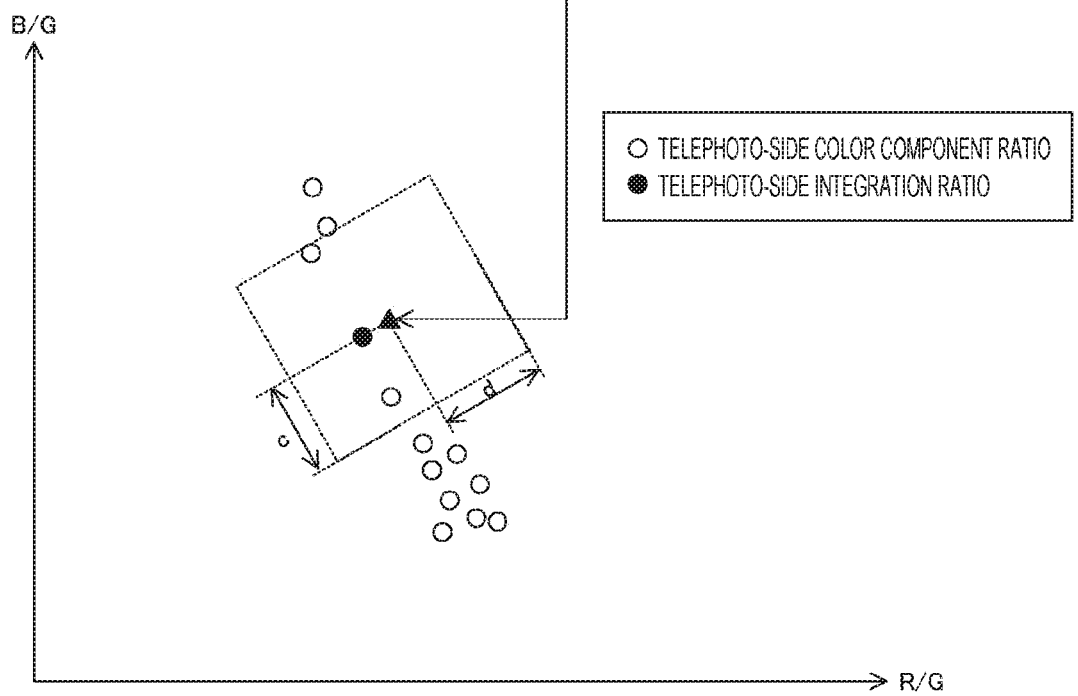

FIGS. 16A and 16B are diagrams illustrating an example of a shape of the telephoto-side integration range according to the second modification of the first embodiment of the present technology in FIG. 16A is a scatter diagram in which data of wide-angle-side color component ratios is plotted, and FIG. 16B is a scatter diagram in which data of telephoto-side color component ratios is plotted. As illustrated in FIG. 16B, a white balance correction unit 300 sets a rectangular range centered on a wide-angle-side integration ratio and having sides parallel to sides of the wide-angle-side integration range as the telephoto-side integration range. Values in which the telephoto-side integration range does not go beyond the wide-angle-side integration range are set to distances c and d from the center.

As described above, in the second modification of the first embodiment of the present technology, the imaging device 100 sets the telephoto-side integration range with the sides parallel to the wide-angle-side integration range, thereby making the distance from the center longer than the first embodiment. Thereby, the area of the telephoto-side integration range becomes large. Therefore, the number of plots in the telephoto-side integration range becomes large, and the accuracy of white balance correction can be improved.

Third Modification

In the above-described first embodiment, the white balance correction unit 300 has set the telephoto-side integration range so as not to go beyond the wide-angle-side integration range. However, the wide-angle-side integration range has various shapes and sometimes has a complicated shape. Therefore, if the telephoto-side integration range is set not to go beyond the wide-angle-side integration range, there is a possibility that the distances c and d from the center become too short. If the distances c and d are too short, a sufficient number of plots are not plotted within the telephoto-side integration range, and the correction accuracy may be decreased. In this case, for example, a predetermined integration range is set on a telephoto side as a reference integration range, separately from a wide-angle-side integration range, and an imaging device 100 is only required to perform integration in an overlapping range between the reference integration range and a predetermined range centered on the wide-angle-side integration range. The imaging device 100 according to a third modification of the first embodiment is different from the first embodiment in performing integration in the overlapping range between the reference integration range and the predetermined range centered on the wide-angle-side integration ratio.

Figure 17:
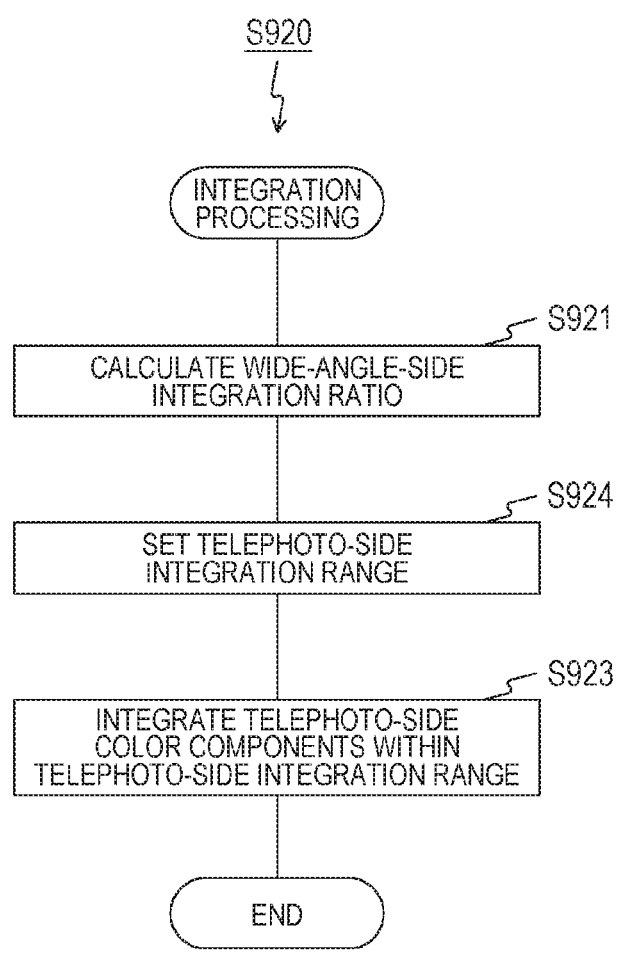
FIG. 17 is a flowchart illustrating an example of integration processing according to a third modification of the first embodiment of the present technology.

FIG. 17 is a flowchart illustrating an example of integration processing according to the third modification of the first embodiment of the present technology. The integration processing according to the third modification of the first embodiment is different from the first embodiment in executing step S924 instead of step S922.

A white balance correction unit 300 calculates the wide-angle-side integration ratio (step S921), and sets the overlapping range between the predetermined range centered on the wide-angle-side integration ratio and the reference integration range as the telephoto-side integration range (step S924). Here, the reference integration range is a predetermined integration range individually set on a telephoto side from the wide-angle-side integration range. Then, the white balance correction unit 300 integrates color components on the telephoto side within the telephoto-side integration range to calculate a telephoto-side integration ratio (step S923). After step S923, the white balance correction unit 300 terminates the integration processing.

Figure 18A:
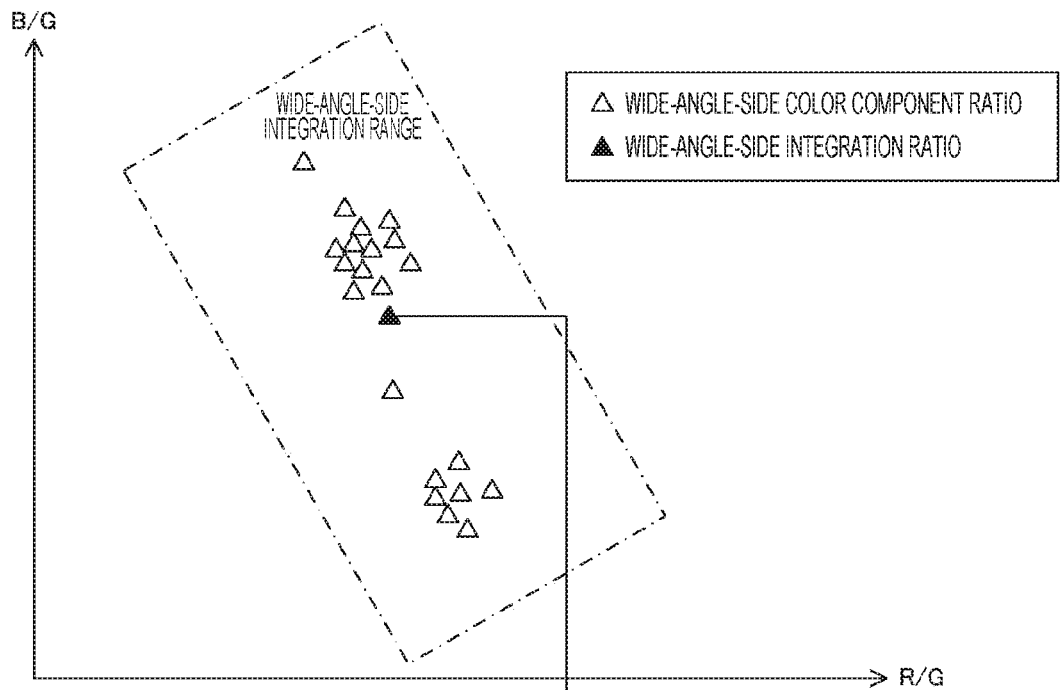
FIGS. 18A and 18B are diagrams illustrating an example of a shape of a rectangular telephoto-side integration range according to the third modification of the first embodiment of the present technology.
Figure 18B:
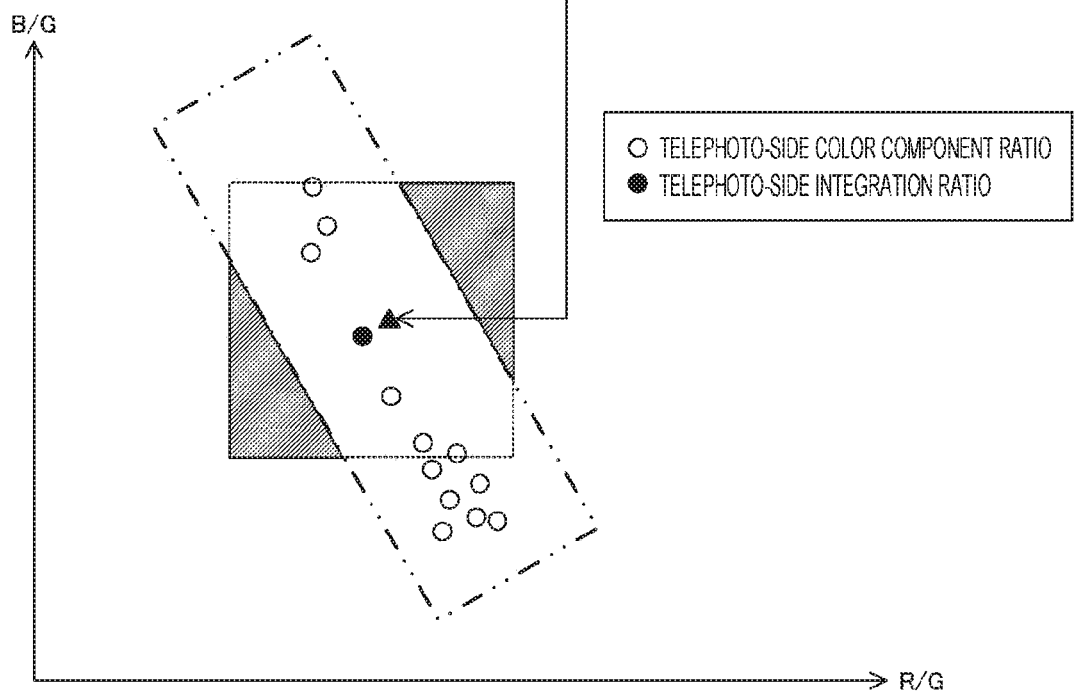

FIGS. 18A and 18B are diagrams illustrating an example of a shape of a rectangular telephoto-side integration range according to the third modification of the first embodiment of the present technology in FIG. 18A is a scatter diagram in which data of wide-angle-side color component ratios is plotted, and FIG. 18B is a scatter diagram in which data of telephoto-side color component ratios is plotted. The region surrounded by the two-dot chain line in FIG. 18B represents the reference integration range. The white balance correction unit 300 sets the overlapping range between the rectangular range centered on the wide-angle-side integration ratio and the reference integration range as the telephoto-side integration range. The hatched portions in FIGS. 18A and 18B represent regions going beyond the reference integration range, of the rectangular range centered on the wide-angle-side integration ratio. Plots in the hatched portions are not used for calculation. Note that the white balance correction unit 300 can set an overlapping portion between the predetermined range centered on the wide-angle-side integration ratio and the wide-angle-side integration range as the telephoto-side integration range, without setting the reference integration range on the telephoto side.

Figure 19A:
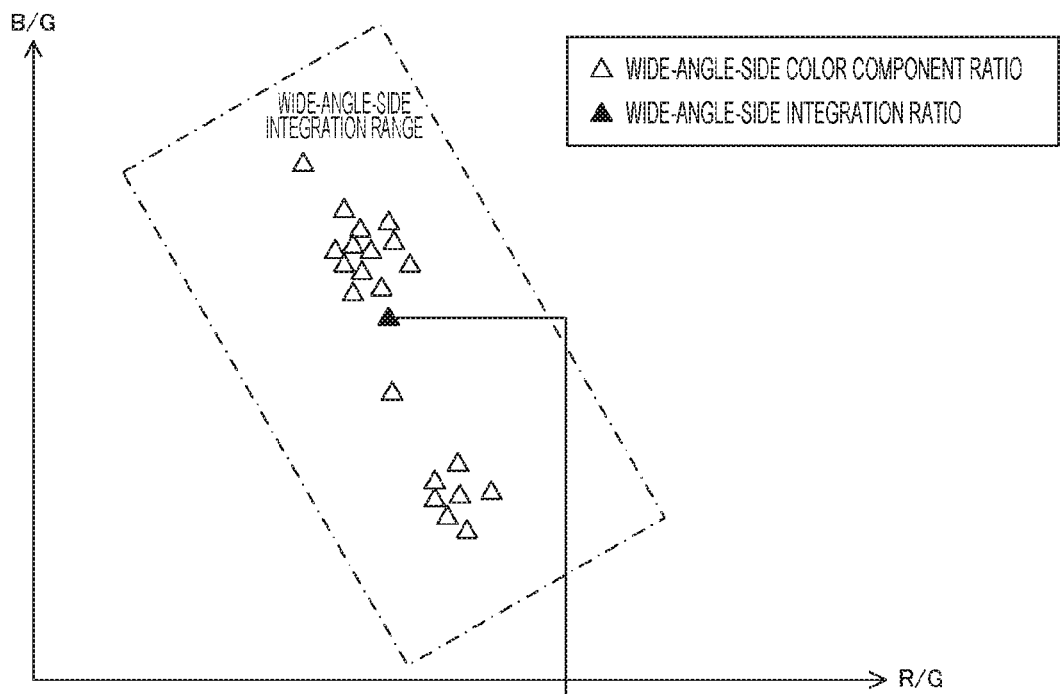
FIGS. 19A and 19B are diagrams illustrating an example of a shape of an elliptical telephoto-side integration range according to the third modification of the first embodiment of the present technology.
Figure 19B:
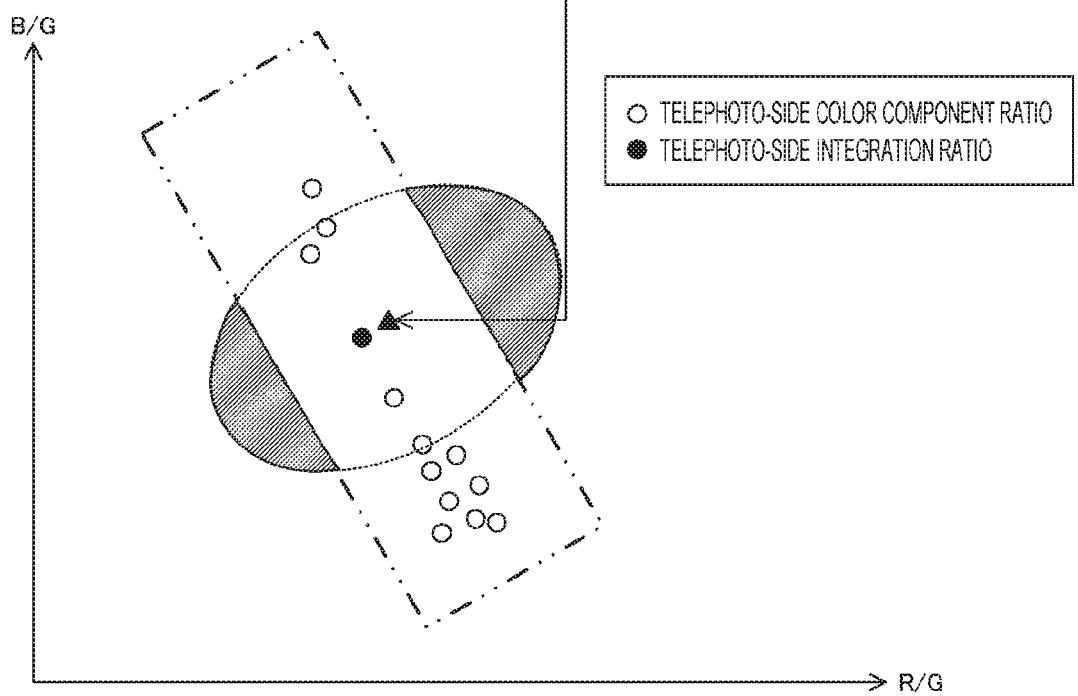

Note that, as illustrated in FIGS. 19A and 19B, the imaging device 100 can perform the integration in an overlapping range between an elliptical range centered on the wide-angle-side integration ratio and the reference integration range. Furthermore, the imaging device 100 can perform the integration in an overlapping range between a circular range centered on the wide-angle-side integration ratio and the reference integration range.

As described above, according to the third modification of the first embodiment of the present technology, the imaging device 100 performs the integration within the overlapping range between the rectangular range centered on the wide-angle-side integration ratio and the reference integration range, thereby making the distance from the center longer than the first embodiment. Thereby, the area of the telephoto-side integration range becomes large. Therefore, the number of plots in the telephoto-side integration range becomes large, and the accuracy of white balance correction can be improved.

2. Second Embodiment

In the above-described first embodiment, the imaging device 100 has performed the white balance correction using the plots in the wide-angle-side integration range. However, in a case where the number of plots in the wide-angle-side integration range is very small and the number of plots does not satisfy a statistically reliable number, the correction accuracy may be decreased. Furthermore, in a case where the detection values of the color components in the wide-angle-side integration range are very small and are not significant values, the correction accuracy may be decreased. An imaging device 100 according to a second embodiment is different from the first embodiment in determining presence or absence of reliability of plots on a wide-angle side and performing calculation in a case where there is the reliability. Furthermore, in the second embodiment, it is assumed that a reference integration range is individually set in advance from the wide-angle-side integration range on a telephoto side.

Figure 20:
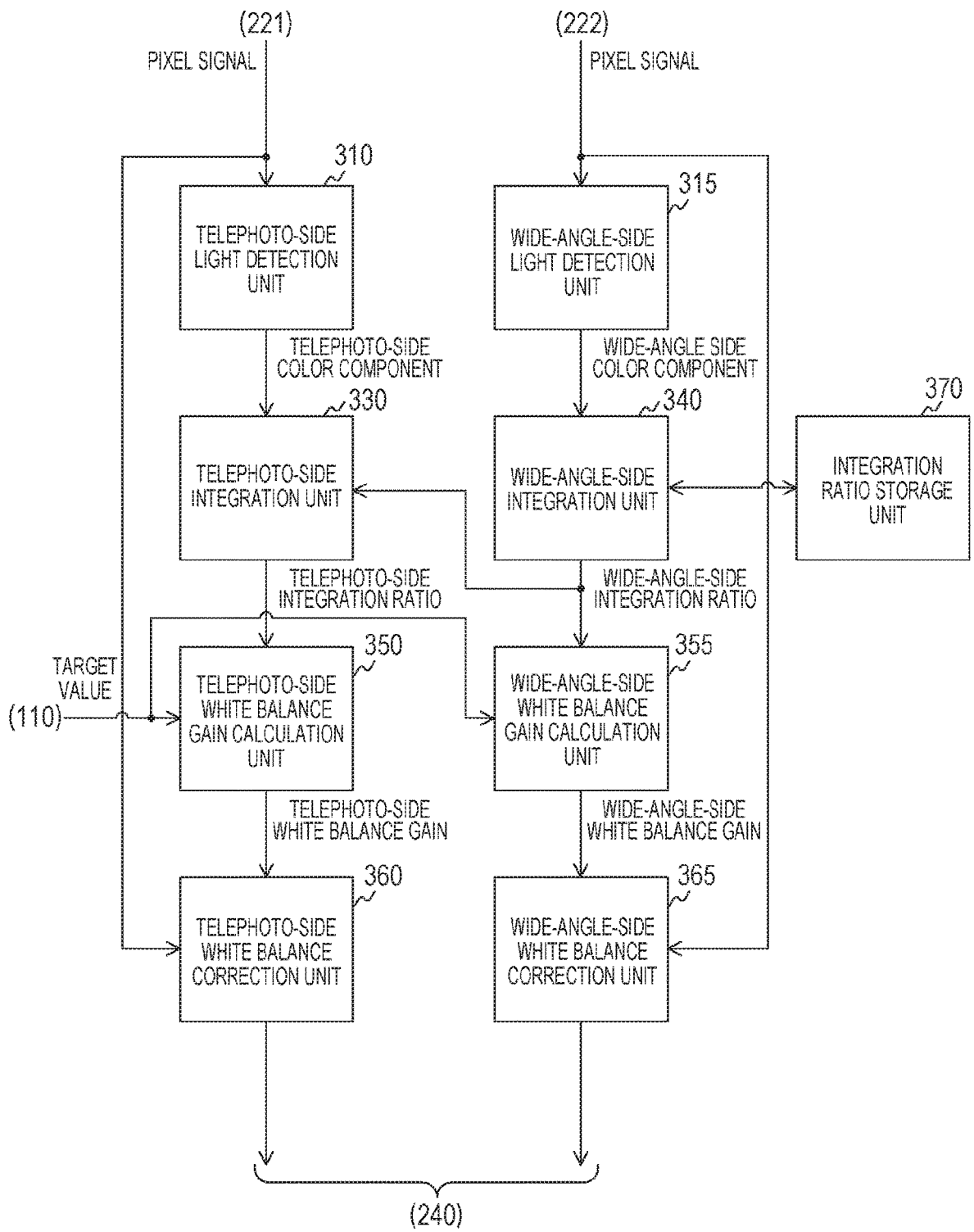
FIG. 20 is a block diagram illustrating a configuration example of a white balance correction unit according to a second embodiment of the present technology.

FIG. 20 is a block diagram illustrating a configuration example of a white balance correction unit 300 according to the second embodiment of the present technology. The white balance correction unit 300 according to the second embodiment is different from the first embodiment in further including an integration ratio storage unit 370.

The integration ratio storage unit 370 stores a wide-angle-side integration ratio. A wide-angle-side integration unit 340 according to the second embodiment determines presence or absence of reliability of entire plots in the wide-angle-side integration range, for each period of a vertical synchronization signal, and calculates the wide-angle-side integration ratio in a case where there is the reliability. Then, the wide-angle-side integration unit 340 causes the integration ratio storage unit 370 to store the calculated telephoto-side integration ratio and supplies the telephoto-side integration ratio to a telephoto-side integration unit 330 and a wide-angle-side white balance gain calculation unit 355.

On the other hand, in a case where there is no reliability, the wide-angle-side integration unit 340 reads the wide-angle-side integration ratio calculated in previous wide-angle image data (frame) from the integration ratio storage unit 370 and supplies the wide-angle-side integration ratio to the wide-angle-side white balance gain calculation unit 355.

Figure 21:
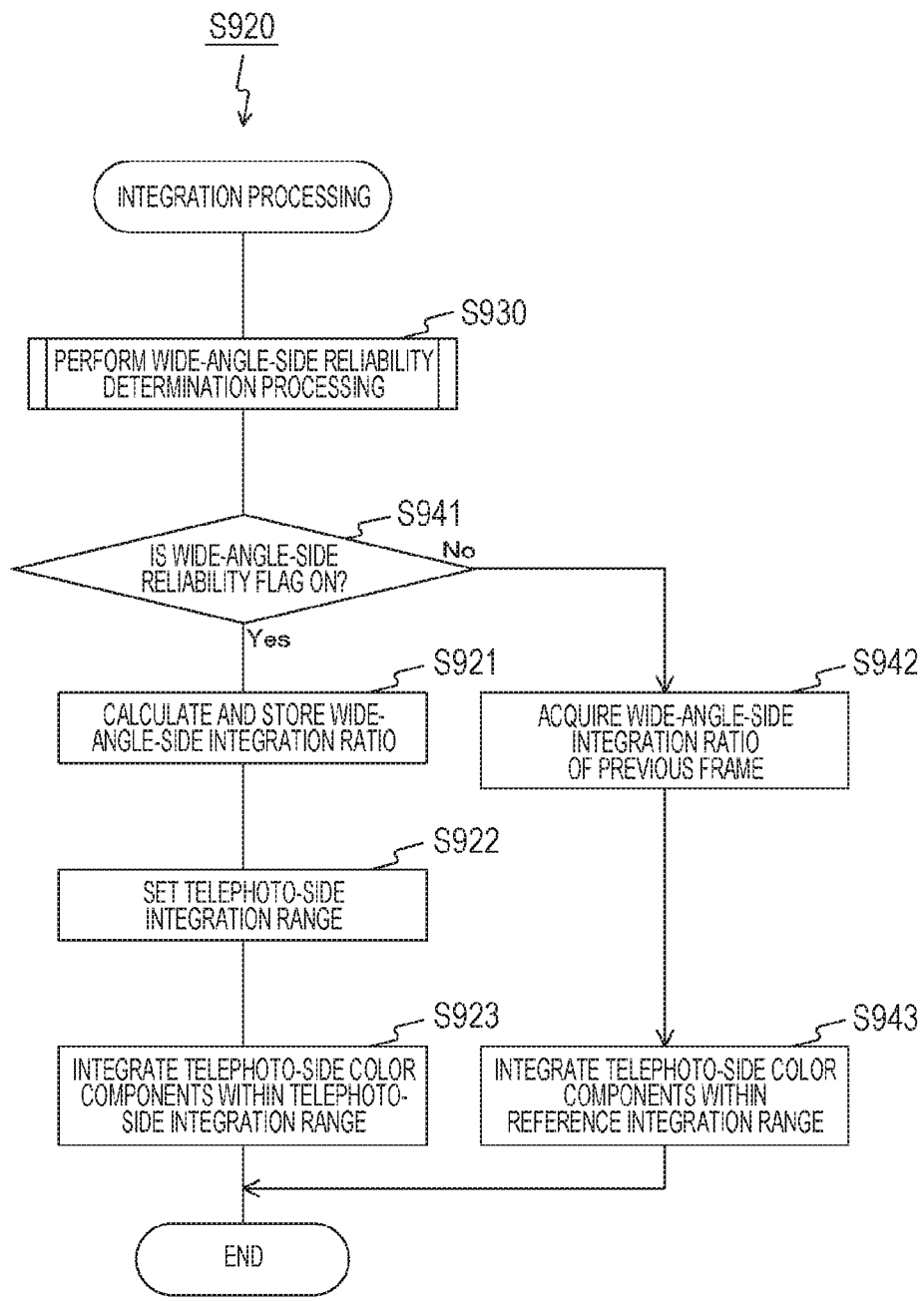
FIG. 21 is a flowchart illustrating an example of integration processing according to the second embodiment of the present technology.

FIG. 21 is a flowchart illustrating an example of integration processing according to the second embodiment of the present technology. The integration processing according to the second embodiment is different from the first embodiment in further executing step S930 and steps S941 to S943.

The white balance correction unit 300 executes wide-angle-side reliability determination processing for determining the presence or absence of the reliability of wide-angle-side color components (step S930). Then, the white balance correction unit 300 determines whether or not a wide-angle side reliability flag is ON (step S941). Here, the wide-angle side reliability flag is a flag indicating the presence or absence of the reliability of the wide-angle-side color components, and is set to ON in a case where there is the reliability and is set to OFF in a case where there is no reliability.

In a case where the wide-angle side reliability flag is ON (step S941: Yes), the white balance correction unit 300 executes step S921 and the subsequent steps. On the other hand, in a case where the wide-angle side reliability flag is OFF (step S941: No), the white balance correction unit 300 acquires the wide-angle-side integration ratio of the previous frame from the integration ratio storage unit 370 (step S942). Here, in a first frame in step S942, the previous frame does not exist. Therefore, a predetermined initial value is used as the wide-angle-side integration ratio. Then, the white balance correction unit 300 integrates telephoto-side color components within the reference integration range to obtain a telephoto-side integration ratio (step S943) and terminates the integration processing.

Figure 22:
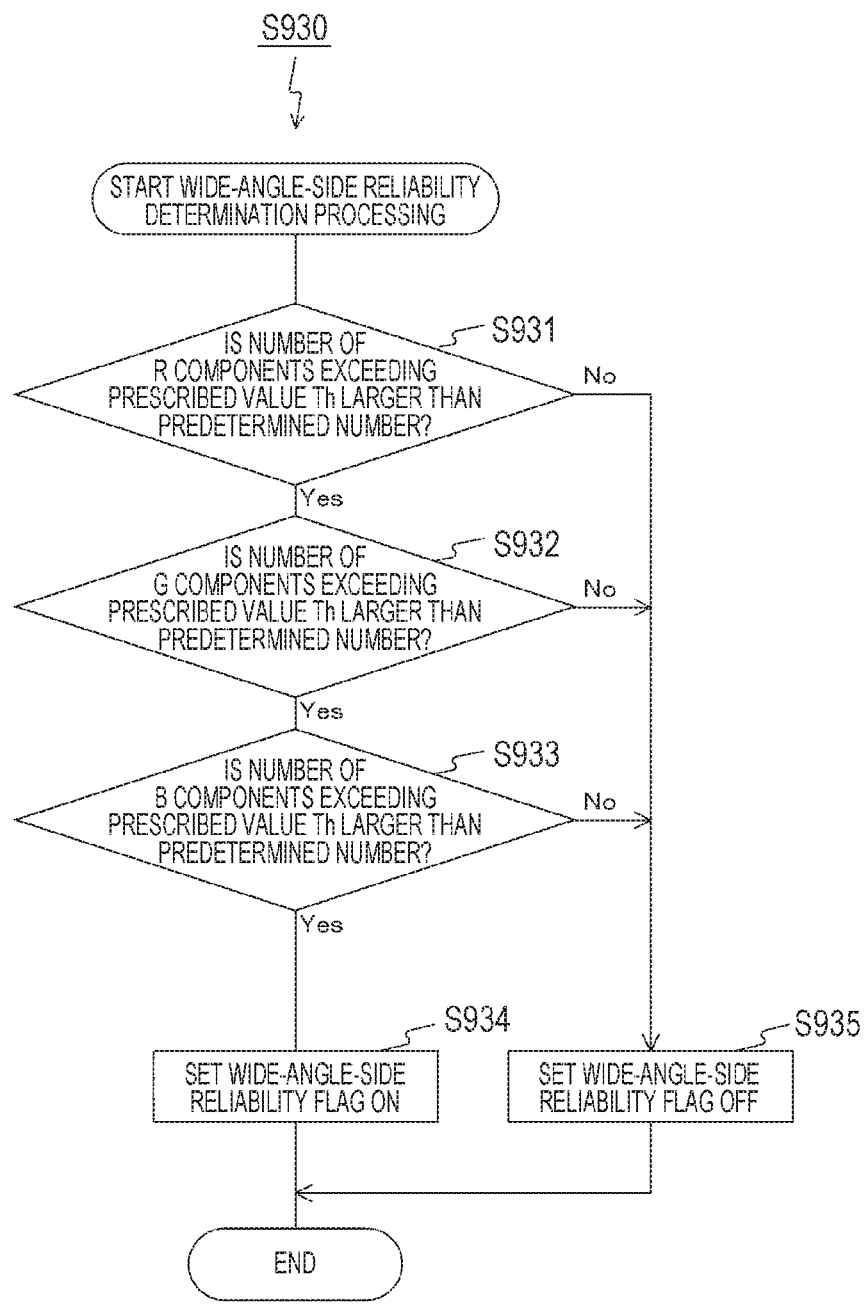
FIG. 22 is a flowchart illustrating an example of wide-angle-side reliability determination processing according to the second embodiment of the present technology.

FIG. 22 is a flowchart illustrating an example of the wide-angle-side reliability determination processing according to the second embodiment of the present technology. The white balance correction unit 300 determines whether or not the number of plots of R components exceeding a prescribed value Th is larger than a predetermined value within the wide-region-side integration range (step S931).

In a case where the number of plots of R components exceeding the prescribed value Th is larger than the predetermined value (step S931: Yes), the white balance correction unit 300 determines whether or not the number of plots of G components exceeding the prescribed value Th is larger than a predetermined value in the wide-region-side integration range (step S932).

In a case where the number of plots of G components exceeding the prescribed value Th is larger than the predetermined value (step S932: Yes), the white balance correction unit 300 determines whether or not the number of plots of B components exceeding the prescribed value Th is larger than a predetermined value in the wide-region-side integration range (step S933).

In a case where the number of plots of B components exceeding the prescribed value Th is larger than the predetermined value (step S933: Yes), the white balance correction unit 300 sets ON to the wide-angle side reliability flag (step S934).

In a case where the number of the R components exceeding the prescribed value Th is equal or smaller than the predetermined value (step S931: No), the white balance correction unit 300 sets OFF to the wide-angle side reliability flag (step S935). Furthermore, in a case where the number of the G components exceeding the prescribed value Th is equal or smaller than the predetermined value (step S932: No) or the number of the B components exceeding the prescribed value Th is equal or smaller than the predetermined value (step S933: No), the white balance correction unit 300 sets OFF to the wide-angle side reliability flag (step S935). After step S934 or S935, the white balance correction unit 300 terminates the wide-angle-side reliability determination processing.

As described above, in the second embodiment of the present technology, the imaging device 100 calculates the wide-angle-side integration ratio in a case where there is the reliability in the wide-angle-side color components and does not use the color components without the reliability, thereby further improving the accuracy of the white balance correction.

First Modification

In the above-described second embodiment, the imaging device 100 has performed the white balance correction using the plots in the telephoto-side integration range. However, in a case where the number of plots in the telephoto-side integration range is very small and the number of plots does not satisfy a statistically reliable number, the correction accuracy may be decreased. Furthermore, in a case where detection values of the color components in the telephoto-side integration range are very small and are not significant values, the correction accuracy may be decreased. An imaging device 100 according to a first modification of the second embodiment is different from the first embodiment in determining presence or absence of reliability of plots on a telephoto side and performing calculation in a case where there is the reliability.

Figure 23:
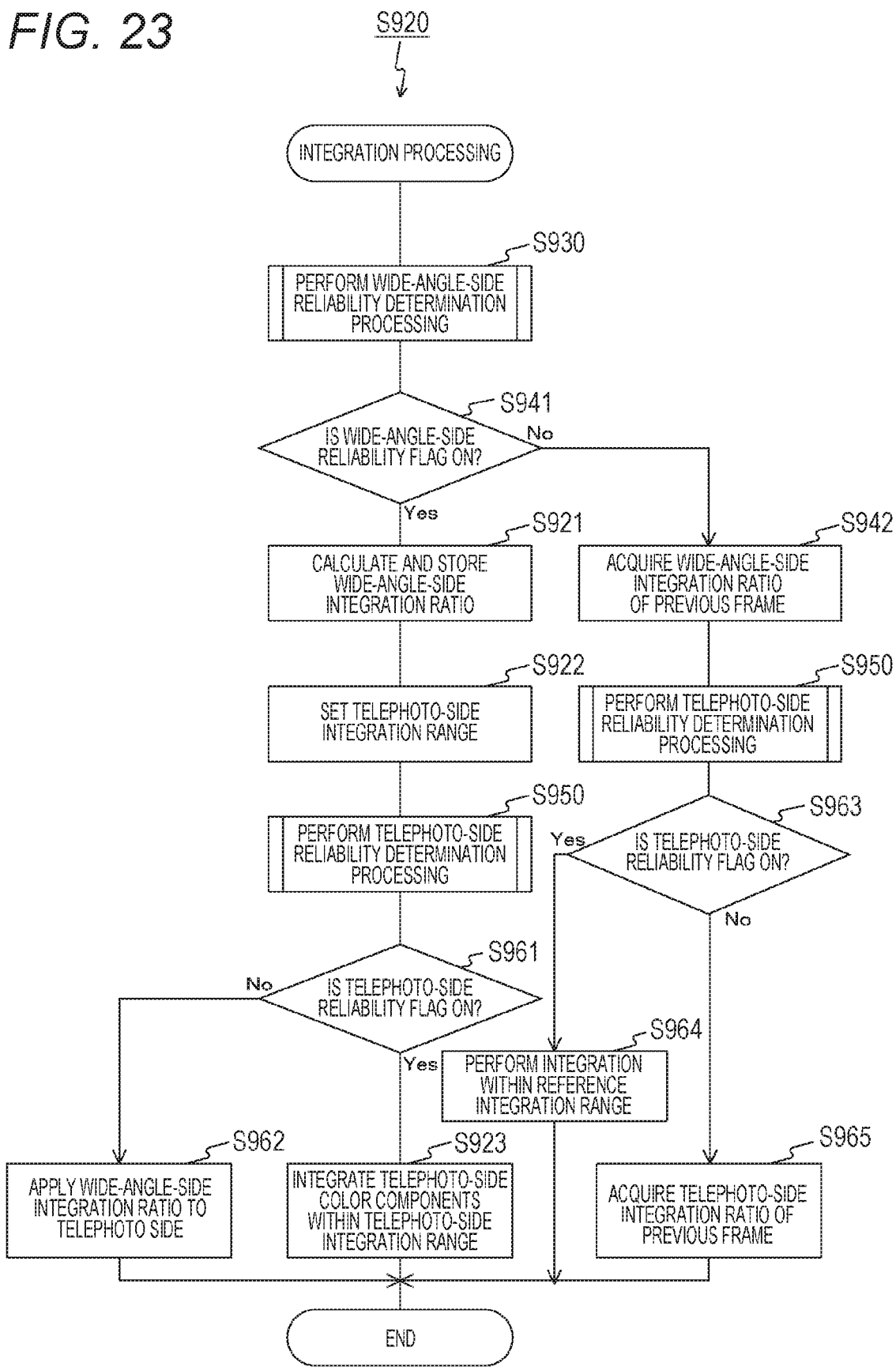
FIG. 23 is a flowchart illustrating an example of integration processing according to a first modification of the second embodiment of the present technology.

FIG. 23 is a flowchart illustrating an example of integration processing according to the first modification of the second embodiment of the present technology. The integration processing of the modification of the second embodiment is different from the second embodiment in further executing steps S950, S961, S962, S963, S964, and S965.

A white balance correction unit 300 sets the telephoto-side integration range (step S922) and executes telephoto-side reliability determination processing for determining presence or absence of reliability of telephoto-side color components (step S950). Then, the white balance correction unit 300 determines whether or not a telephoto-side reliability flag is ON (step S961). Here, the telephoto-side reliability flag is a flag indicating the presence or absence of the reliability of the telephoto-side color components, and is set to ON in a case where there is the reliability and is set to OFF in a case where there is no reliability.

In a case where the telephoto-side reliability flag is ON (step S961: Yes), the white balance correction unit 300 executes step S923 and the subsequent steps. On the other hand, in a case where the telephoto-side reliability flag is OFF (step S961: No), the white balance correction unit 300 applies the wide-angle-side integration ratio to the telephoto side as it is (step S962). In other words, a value same as the wide-angle-side integration ratio is set to the telephoto-side integration ratio. After step S962, the white balance correction unit 300 terminates the integration processing.

Furthermore, in the case where the wide-angle side reliability flag is OFF (step S941: No), the white balance correction unit 300 acquires the wide-angle-side integration ratio of the previous frame from a integration ratio storage unit 370 (step S942). Next, the white balance correction unit 300 executes the telephoto-side reliability determination processing (step S950). Then, the white balance correction unit 300 determines whether or not the telephoto-side reliability flag is ON (step S963). In a case where the telephoto-side reliability flag is ON (step S963: Yes), the white balance correction unit 300 performs integration within the reference integration range on the telephoto side (step S964). On the other hand, in a case where the telephoto-side reliability flag is OFF (step S963: No), the white balance correction unit 300 acquires the telephoto-side integration ratio of the previous frame from the integration ratio storage unit 370 (step S965). Here, in a first frame in step S965, the previous frame does not exist. Therefore, a predetermined initial value is used as the telephoto-side integration ratio. After step S964 or S965, the white balance correction unit 300 terminates the integration processing.

Figure 24:
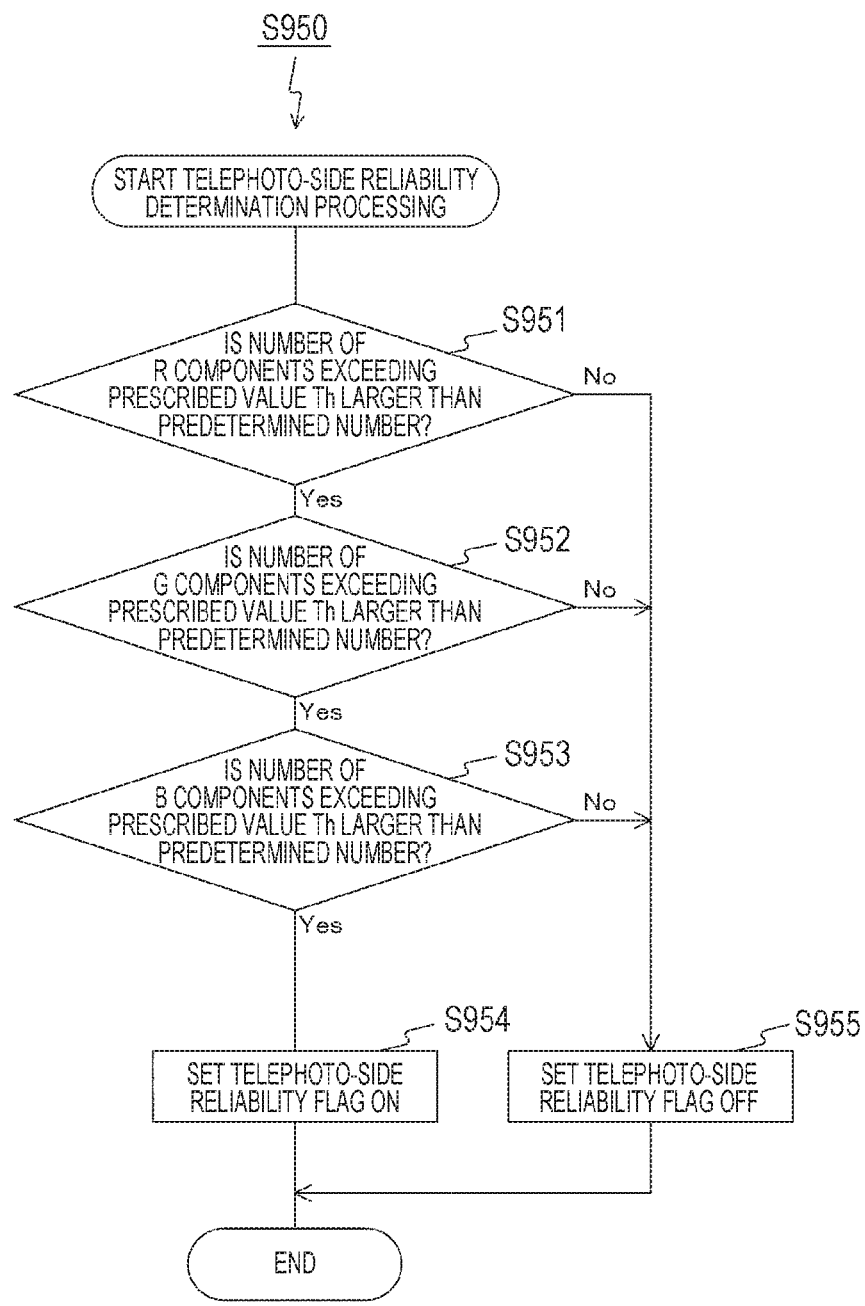
FIG. 24 is a flowchart illustrating an example of telephoto-side reliability determination processing according to the first modification of the second embodiment of the present technology.

FIG. 24 is a flowchart illustrating an example of telephoto-side reliability determination processing according to the first modification of the second embodiment of the present technology. The white balance correction unit 300 determines whether or not the number of plots of R components exceeding a prescribed value Th is larger than a predetermined value within the telephoto-side integration range (step S951).

In a case where the number of plots of R components exceeding the prescribed value Th is larger than the predetermined value (step S951: Yes), the white balance correction unit 300 determines whether or not the number of plots of G components exceeding the prescribed value Th is larger than a predetermined value in a telephoto wide-region-side integration range (step S952).

In a case where the number of plots of G components exceeding the prescribed value Th is larger than the predetermined value (step S952: Yes), the white balance correction unit 300 determines whether or not the number of plots of B components exceeding the prescribed value Th is larger than a predetermined value in the telephoto-side integration range (step S953).

In a case where the number of plots of B components exceeding the prescribed value Th is larger than the predetermined value (step S953: Yes), the white balance correction unit 300 sets ON to the telephoto-side reliability flag (step S954).

In a case where the number of the R components exceeding the prescribed value Th is equal or smaller than the predetermined value (step S951: No), the white balance correction unit 300 sets OFF to the telephoto-side reliability flag (step S955). Furthermore, in a case where the number of the G components exceeding the prescribed value Th is equal or smaller than the predetermined value (step S952: No) or the number of the B components exceeding the prescribed value Th is equal or smaller than the predetermined value (step S953: No), the white balance correction unit 300 sets OFF to the telephoto-side reliability flag (step S955). After step S954 or S955, the white balance correction unit 300 terminates the telephoto-side reliability determination processing.

As described above, in the first modification of the second embodiment of the present technology, the imaging device 100 calculates the telephoto-side integration ratio in a case where there is the reliability in the telephoto-side color components and does not use the color components without the reliability, thereby further improving the accuracy of the white balance correction.

Second Modification

In the above-described second embodiment, the white balance correction unit 300 has compared the R components, the G components, and the B components with the same prescribed value Th in the wide-angle-side reliability determination processing. However, there are some cases where the sensitivity of pixels that receive R and B and the sensitivity of pixels that receive G are different. In this case, it is desirable to set different prescribed values for R components, G components, and B components on the basis of sensitivities. An imaging device 100 of a second modification of the second embodiment is different from the second embodiment in comparing R components, G components, and B components with different prescribed values.

Figure 25:
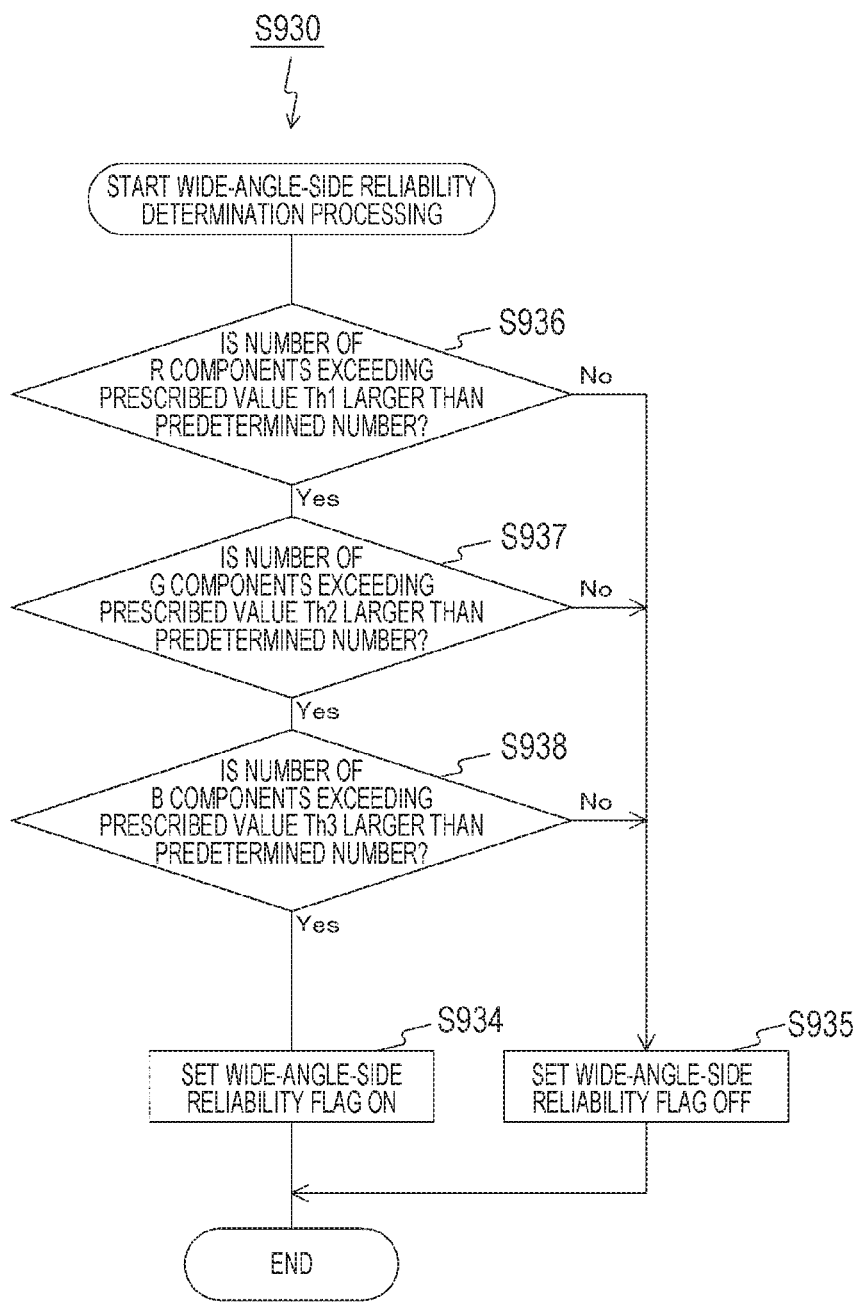
FIG. 25 is a flowchart illustrating an example of wide-angle-side reliability determination processing according to a second modification of the second embodiment of the present technology.

FIG. 25 is a flowchart illustrating an example of wide-angle-side reliability determination processing according to the second modification of the second embodiment of the present technology. The wide-angle-side reliability determination processing according to the second modification of the second embodiment is different from the second embodiment in executing steps S936 to S938 instead of steps S931 to S933.

A white balance correction unit 300 determines whether or not the number of plots of R components exceeding a prescribed value Th1 is larger than a predetermined value within a wide-region-side integration range (step S936).

In a case where the number of plots of R components exceeding the prescribed value Th1 is larger than the predetermined value (step S936: Yes), the white balance correction unit 300 determines whether or not the number of plots of G components exceeding the prescribed value Th2 is larger than a predetermined value in the wide-region-side integration range (step S937).

In a case where the number of plots of G components exceeding the prescribed value Th2 is larger than the predetermined value (step S937: Yes), the white balance correction unit 300 determines whether or not the number of plots of B components exceeding the prescribed value Th3 is larger than a predetermined value in the wide-region-side integration range (step S938). Here, values according to the respective sensitivities of R, G, and B pixels are set as the prescribed values Th1, Th2, and Th3.

As described above, in the second modification of the second embodiment of the present technology, the imaging device 100 sets the prescribed values according to the sensitivities of the pixels for the respective color components, thereby appropriately determining the presence or absence of the reliability of the color components even in a case where the sensitivity is different for each color component. Thereby, the accuracy of white balance correction can be improved.

3. Third Embodiment

In the above-described first embodiment, the white balance correction has been performed in the binocular imaging device 100. However, white balance correction may be able to be performed in a trinocular or more compound-eye imaging system. The imaging system according to a third embodiment is different from the first embodiment in performing white balance correction in the trinocular or more compound-eye imaging system.

Figure 26:
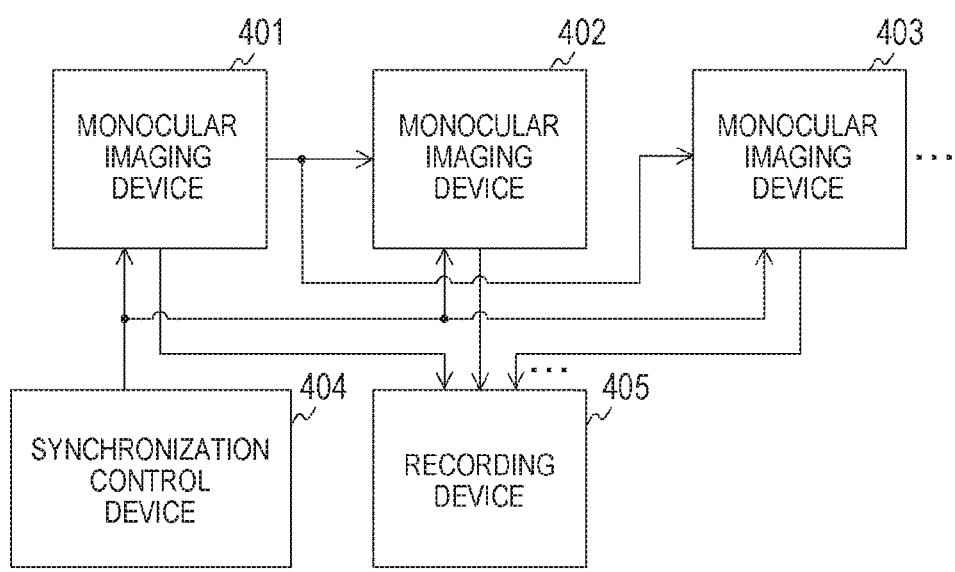
FIG. 26 is a block diagram illustrating a configuration example of an imaging system according to a third embodiment of the present technology.

FIG. 26 is a block diagram illustrating a configuration example of the imaging system according to the third embodiment of the present technology. The imaging device stem includes three or more monocular imaging devices such as monocular imaging devices 401, 402, and 403, a synchronization control device 404, and a recording device 405.

The synchronization control device 404 synchronizes operations of the monocular imaging devices 401 and the like by supplying a vertical synchronization signal VSYNC.

The configuration of the monocular imaging device 401 is similar to the configuration of the wide-angle-side monocular camera module 202 of the first embodiment. The wide-angle-side monocular imaging device 401 supplies a wide-angle-side integration ratio to the telephoto-side monocular imaging device 403 and the like. The configurations of the other monocular imaging devices such as the monocular imaging device 402 are similar to the configuration of the telephoto-side monocular camera module 201 of the first embodiment.

The recording device 405 records image data imaged by the monocular imaging device 401 or the like. Note that the recording device 405 is an example of a recording unit described in the claims.

For example, by arranging the monocular imaging device 401 or the like at a predetermined monitoring position in a factory and analyzing the image data, the imaging system can detect an abnormality in the factory. The imaging system can image three or more pieces of image data for which the white balance correction has been performed with high accuracy, thereby increasing the accuracy of analysis of the image data.

As described above, according to the third embodiment of the present technology, a gain according to the telephoto-side integration ratio is obtained on the basis of the wide-angle-side integration ratio and the telephoto-side color components in the telephoto-side monocular imaging device 402 and the like. Therefore, the correction accuracy can be improved in the trinocular or more imaging system.

4. Application Example to Mobile Bodies

The technology according to the present disclosure (present technology) can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 27:
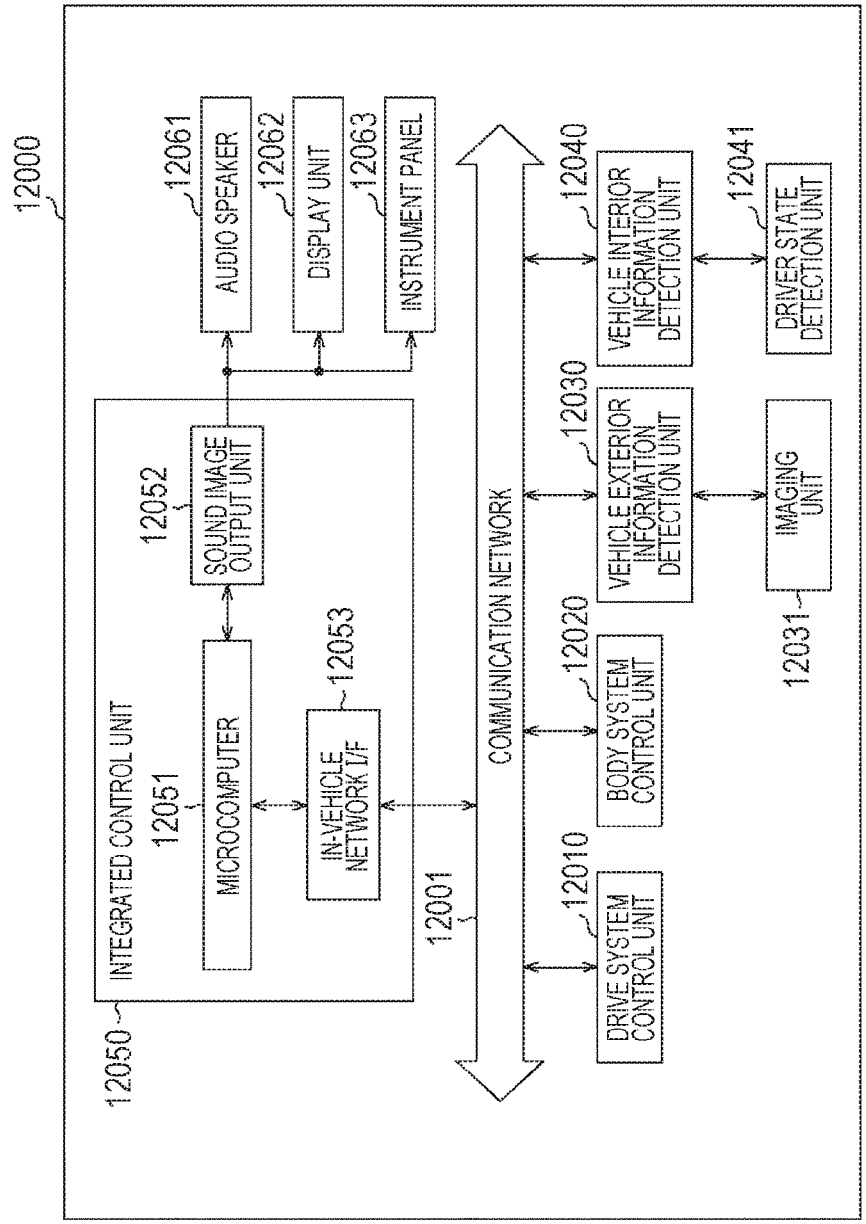
FIG. 27 is a block diagram illustrating an example of a schematic configuration of a vehicle control system.

FIG. 27 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 27, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to image an image outside the vehicle, and receives the imaged image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to the amount of received light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive power generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic driving of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 27, as the output device, an audio speaker 12061, a display unit 12062, and an instrument panel 12063 are exemplarily illustrated. The display unit 12062 may include, for example, at least one of an on-board display or a head-up display.

Figure 28:
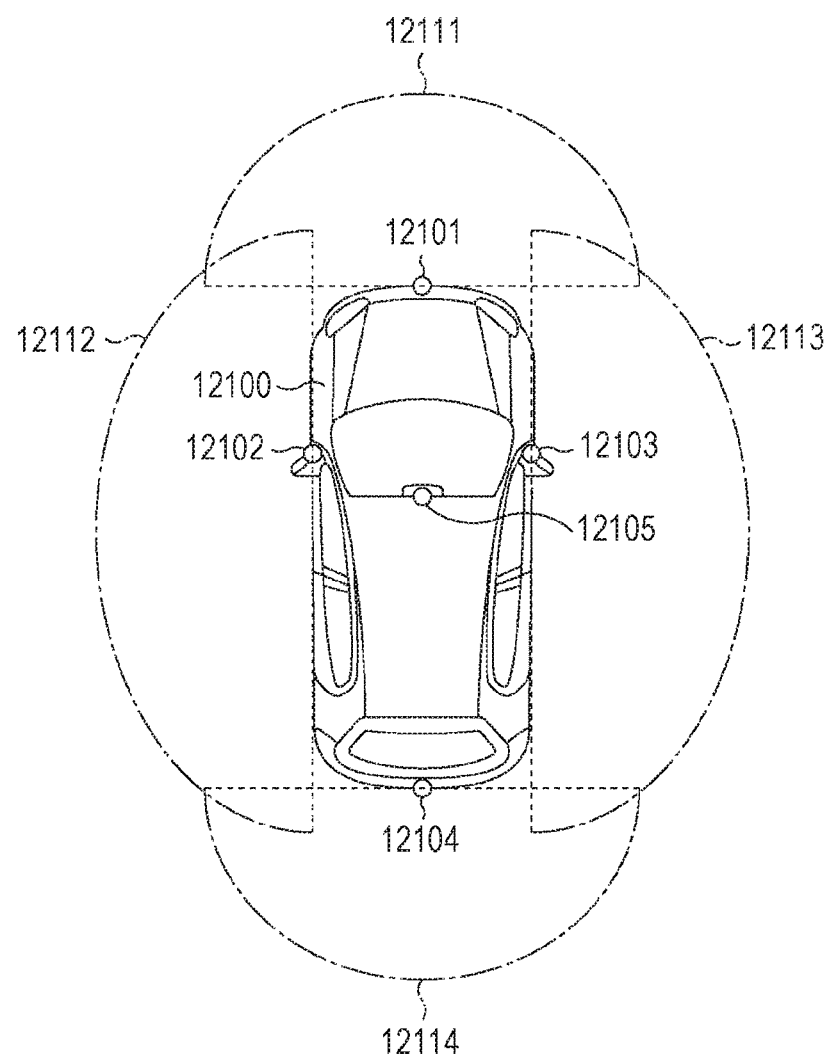
FIG. 28 is an explanatory diagram illustrating an example of installation positions of a vehicle exterior information detection unit and an imaging unit.

FIG. 28 is a diagram illustrating an example of an installation position of the imaging unit 12031.

In FIG. 28, a vehicle 12100 includes, as the imaging unit 12031, imaging units 12101, 12102, 12103, 12104, and 12105.

The imaging units 12101, 12102, 12103, 12104, and 12105 are provided at positions such as a front nose, side mirrors, a rear bumper or a back door, and an upper portion of a windshield in an interior of the vehicle 12100, for example. The imaging unit 12101 provided at the front nose and the imaging unit 12105 provided at an upper portion of the windshield in an interior of the vehicle mainly acquire front images of the vehicle 12100. The imaging units 12102 and 12103 provided at the side mirrors mainly acquire side images of the vehicle 12100. The imaging unit 12104 provided at the rear bumper or the back door mainly acquires a rear image of the vehicle 12100. The front images acquired in the imaging units 12101 and 12105 are mainly used for detection of a leading vehicle, a pedestrian, an obstacle, a traffic light, a traffic sign, a lane, or the like.

Note that FIG. 28 illustrates an example of imaging ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of imaging elements or may be an imaging element having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic driving of autonomous travel without depending on an operation of the driver or the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. Then, the microcomputer 12051 determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the imaged images of the imaging units 12101 to 12104, thereby to recognize the pedestrian. The recognition of a pedestrian is performed by a process of extracting characteristic points in the imaged images of the imaging units 12101 to 12104, as the infrared camera, for example, and by a process of performing pattern matching processing for the series of characteristic points indicating a contour of an object and discriminating whether or not the object is a pedestrian. When the microcomputer 12051 determines that a pedestrian exists in the imaged images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging units 12101 to 12104 of the above-described configurations. For example, a binocular camera module 200 is disposed inside each of the imaging units 12101 to 12104. By applying the present technology to the imaging units 12101 to 12104, the image quality of image data can be improved. Therefore, driver's fatigue can be reduced.

Note that the above-described embodiments describe an example for embodying the present technology, and the matters in the embodiments and the matters used to specify the invention in the claims have correspondence, respectively. Similarly, the matters used to specify the invention in the claims and the matters in the embodiment of the present technology given the same names have correspondence, respectively. However, the present technology is not limited to the embodiments, and can be embodied by application of various modifications to the embodiments without departing from the gist of the present technology.

Furthermore, the processing procedures described in the above embodiments may be regarded as a method having these series of procedures, and also regarded as a program for causing a computer to execute these series of procedures and as a recording medium for storing the program. As this recording medium, for example, a compact disc (CD), a mini disc (MD), a digital versatile disc (DVD), a memory card, a Blu-ray (registered trademark) disc, or the like can be used.

Note that the effects described in the present specification are merely examples and are not limited, and other effects may be exhibited.

Note that the present technology can also have the following configurations.

(1) An imaging device including:

a wide-angle-side light detection unit configured to detect a plurality of wide-angle-side color components in each of a plurality of regions in a wide-angle image data having an angle of view wider than a predetermined value;

a telephoto-side light detection unit configured to detect a plurality of telephoto-side color components in each of a plurality of regions in telephoto image data having an angle of view narrower than the predetermined value;

a telephoto-side white balance gain acquisition unit configured to obtain a gain for the telephoto image data on the basis of a wide-angle-side integration ratio that is a ratio of respective integration values of the plurality of wide-angle-side color components and the plurality of telephoto-side color components as a telephoto-side white balance gain; and a telephoto-side white balance correction unit configured to correct the telephoto image data with the telephoto-side white balance gain.

(2) The imaging device according to (1), in which the telephoto-side white balance gain acquisition unit sets a predetermined range including the wide-angle-side integration ratio as a telephoto-side integration range, and calculates a gain according to a telephoto-side integration ratio that is a ratio of respective integration values of the plurality of telephoto-side color components within the telephoto-side integration range as the telephoto-side white balance gain.

(3) The imaging device according to (2), in which the plurality of telephoto-side color components includes a red (R) component, a green (G) component, and a blue (B) component, and the telephoto-side white balance gain acquisition unit sets, as the telephoto-side integration range, a range having a predetermined shape centered on the wide-angle-side integration ratio in an orthogonal coordinate system having a ratio of the R component and the G component and a ratio of the B component and the G component as coordinate axes.

(4) The imaging device according to (3), in which the telephoto-side integration range is rectangular.

(5) The imaging device according to (3), in which the telephoto-side integration range is circular.

(6) The imaging device according to (3), in which the telephoto-side integration range is elliptical.

(7) The imaging device according to any one of (3) to (6), further including:

a wide-angle-side white balance gain acquisition unit configured to calculate a ratio of respective integration values of the plurality of wide-angle-side color components within a predetermined wide-angle-side integration range as the wide-angle-side integration ratio, and acquires a gain according to the wide-angle-side integration ratio as a wide-angle-side white balance gain; and a wide-angle-side white balance correction unit configured to correct the wide-angle image data with the wide-angle-side white balance gain.

(8) The imaging device according to (7), in which a side of the telephoto-side integration range is parallel to a side of the predetermined wide-angle-side integration range.

(9) The imaging device according to (2), in which the plurality of telephoto-side color components includes an R component, a G component, and a B component, and the telephoto-side white balance gain acquisition unit sets, as the telephoto-side integration range, an overlapping range between a range having a predetermined shape centered on the wide-angle-side integration ratio and a preset reference integration range in an orthogonal coordinate system having a ratio of the R component and the G component and a ratio of the B component and the G component as coordinate axes

(10) The imaging device according to any one of (7) to (9), in which the wide-angle-side white balance gain acquisition unit determines presence or absence of reliability of the plurality of wide-angle-side color components within the predetermined wide-angle-side integration range, and calculates the wide-angle-side integration ratio in a case where there is the reliability.

(11) The imaging device according to (10), in which the wide-angle-side white balance gain acquisition unit determines whether or not the number of color components exceeding a prescribed value is larger than a predetermined number, for each of the plurality of wide-angle-side color components, and determines the presence or absence of the reliability on the basis of a determination result.

(12) The imaging device according to (10) or (11), in which the telephoto-side white balance gain acquisition unit determines the presence or absence of the reliability of the plurality of telephoto-side color components within the telephoto-side integration range, and calculates the telephoto-side integration ratio in a case where there is the reliability.

(13) The imaging device according to (12), in which the telephoto-side white balance gain acquisition unit determines whether or not the number of color components exceeding a prescribed value is larger than a predetermined number, for each of the plurality of telephoto-side color components, and determines the presence or absence of the reliability on the basis of a determination result.

(14) An imaging system including:

a wide-angle-side light detection unit configured to detect a plurality of wide-angle-side color components in each of a plurality of regions in a wide-angle image data having an angle of view wider than a predetermined value;

a telephoto-side light detection unit configured to detect a plurality of telephoto-side color components in each of a plurality of regions in telephoto image data having an angle of view narrower than the predetermined value;

a telephoto-side white balance gain acquisition unit configured to obtain a gain for the telephoto image data on the basis of a wide-angle-side integration ratio that is a ratio of respective integration values of the plurality of wide-angle-side color components and the plurality of telephoto-side color components as a telephoto-side white balance gain;

a telephoto-side white balance correction unit configured to correct the telephoto image data with the telephoto-side white balance gain; and a recording unit configured to record the corrected telephoto image data.

(15) A method of controlling an imaging device including:

a wide-angle-side light detection step of detecting a plurality of wide-angle-side color components in each of a plurality of regions in a wide-angle image data having an angle of view wider than a predetermined value;

a telephoto-side light detection step of detecting a plurality of telephoto-side color components in each of a plurality of regions in a telephoto image data having an angle of view narrower than the predetermined value;

a telephoto-side white balance gain acquisition step of obtaining a gain for the telephoto image data on the basis of a wide-angle-side integration ratio that is a ratio of respective integration values of the plurality of wide-angle-side color components and the plurality of telephoto-side color components as a telephoto-side white balance gain; and a telephoto-side white balance correction step of correcting the telephoto image data with the telephoto-side white balance gain.

REFERENCE SIGNS LIST

100 Imaging device
110 Camera module control unit
120 Image processing unit
130 Recording unit
200 Binocular camera module
201, 202 Monocular camera module
203 Connecting member
211 Telephoto lens
212 Wide-angle lens
221 Telephoto-side solid-state imaging device
222 Wide-angle-side solid-state imaging device
240 Image combining unit
300 White balance correction unit
310 Telephoto-side light detection unit
315 Wide-angle-side light detection unit
320 Telephoto-side white balance gain acquisition unit 325 Wide-angle-side white balance gain acquisition unit
330 Telephoto-side integration unit
331, 341 Color component ratio calculation unit
332, 342 In-integration range determination unit
333 Integration range setting unit
334, 344 Integration ratio calculation unit
340 Wide-angle-side integration unit
343 Integration range information storage unit
350 Telephoto-side white balance gain calculation unit
355 Wide-angle-side white balance gain calculation unit
360 Telephoto-side white balance correction unit
365 Wide-angle-side white balance correction unit
370 Integration ratio storage unit
401, 402, 403 Monocular imaging device
404 Synchronization control unit
405 Recording device
12101, 12102, 12103, 12104, 12105 Imaging unit

The invention claimed is:

1. An imaging device, comprising:
circuitry configured to:
detect a plurality of wide-angle-side color components in each of a first plurality of regions in wide-angle image data, wherein the wide-angle image data has a first angle of view wider than a determined value;
detect a plurality of telephoto-side color components in each of a second plurality of regions in telephoto image data, wherein the telephoto image data has a second angle of view narrower than the determined value;
calculate a wide-angle-side integration ratio based on a ratio of respective integration values of the plurality of wide-angle-side color components and the plurality of telephoto-side color components;
obtain a telephoto-side white balance gain for the telephoto image data based on the wide-angle-side integration ratio; and
correct the telephoto image data based on the telephoto-side white balance gain.

2. The imaging device according to claim 1, wherein the circuitry is further configured to:
set a telephoto-side integration range that includes the wide-angle-side integration ratio; and
calculate the telephoto-side white balance gain based on a telephoto-side integration ratio, wherein the telephoto-side integration ratio is a ratio of respective integration values of the plurality of telephoto-side color components within the telephoto-side integration range.

3. The imaging device according to claim 2, wherein
the plurality of telephoto-side color components includes a red (R) component, a green (G) component, and a blue (B) component, and
the circuitry is further configured to set the telephoto-side integration range based on a shape centered on the wide-angle-side integration ratio in an orthogonal coordinate system having a ratio of the R component and the G component and a ratio of the B component and the G component as coordinate axes.

4. The imaging device according to claim 3, wherein the telephoto-side integration range is rectangular.

5. The imaging device according to claim 3, wherein the telephoto-side integration range is circular.

6. The imaging device according to claim 3, wherein the telephoto-side integration range is elliptical.

7. The imaging device according to claim 3, wherein the circuitry is further configured to:
calculate the wide-angle-side integration ratio based on a ratio of respective integration values of the plurality of wide-angle-side color components within a wide-angle-side integration range;
acquire a wide-angle-side white balance gain based on the wide-angle-side integration ratio; and
correct the wide-angle image data based on the wide-angle-side white balance gain.

8. The imaging device according to claim 7, wherein a side of the telephoto-side integration range is parallel to a side of the wide-angle-side integration range.

9. The imaging device according to claim 2, wherein
the plurality of telephoto-side color components includes a red (R) component, a green (G) component, and a blue (B) component, and
the circuitry is further configured to set the telephoto-side integration range based on an overlapping range between a range having a shape centered on the wide-angle-side integration ratio and a preset reference integration range in an orthogonal coordinate system having a ratio of the R component and the G component and a ratio of the B component and the G component as coordinate axes.

10. The imaging device according to claim 7, wherein the circuitry is further configured to:
determine presence or absence of reliability of the plurality of wide-angle-side color components within the wide-angle-side integration range; and
calculate the wide-angle-side integration ratio based on the presence of the reliability.

11. The imaging device according to claim 10, wherein the circuitry is further configured to:
determine a result based on a determination whether a number of color components of the plurality of wide-angle-side color components that exceeds a threshold value is larger than a threshold number; and
determine the presence or absence of the reliability based on the result.

12. The imaging device according to claim 10, wherein the circuitry is further configured to:
determine the presence or absence of the reliability of the plurality of telephoto-side color components within the telephoto-side integration range; and
calculate the telephoto-side integration ratio based on the presence of the reliability.

13. The imaging device according to claim 12, wherein the circuitry is further configured to:
determine a result based on a determination whether a number of color components of the plurality of telephoto-side color components that exceeds a threshold is larger than a threshold number; and
determine the presence or absence of the reliability based on the result.

14. An imaging system, comprising:
circuitry configured to:
detect a plurality of wide-angle-side color components in each of a first plurality of regions in wide-angle image data, wherein the wide-angle image data has a first angle of view wider than a value;
detect a plurality of telephoto-side color components in each of a second plurality of regions in telephoto image data, wherein the telephoto image data has a second angle of view narrower than the value;
calculate a wide-angle-side integration ratio based on a ratio of respective integration values of the plurality of wide-angle-side color components and the plurality of telephoto-side color components;

obtain a telephoto-side white balance gain for the telephoto image data based on the wide-angle-side integration ratio; and correct the telephoto image data based on the telephoto-side white balance gain; and a recording unit configured to record the corrected telephoto image data.

15. A method of controlling an imaging device, comprising:

detecting a plurality of wide-angle-side color components in each of a first plurality of regions in wide-angle image data, wherein the wide-angle image data has a first angle of view wider than a value;

detecting a plurality of telephoto-side color components in each of a second plurality of regions in a telephoto image data, wherein the telephoto image data has a second angle of view narrower than the value;

calculating a wide-angle-side integration ratio based on a ratio of respective integration values of the plurality of wide-angle-side color components and the plurality of telephoto-side color components;

obtaining a telephoto-side white balance gain for the telephoto image data based on the wide-angle-side integration ratio; and correcting the telephoto image data based on the telephoto-side white balance gain.

16. An imaging device, comprising:
circuitry configured to:

detect a plurality of wide-angle-side color components in each of a first plurality of regions in wide-angle image data, wherein the wide-angle image data has a first angle of view wider than a value;

detect a plurality of telephoto-side color components in each of a second plurality of regions in telephoto image data, wherein the telephoto image data has a second angle of view narrower than the value;

obtain a telephoto-side white balance gain for the telephoto image data based on a wide-angle-side integration ratio, wherein the wide-angle-side integration ratio is a ratio of respective integration values of the plurality of wide-angle-side color components and the plurality of telephoto-side color components;

set a telephoto-side integration range that includes the wide-angle-side integration ratio;

calculate the telephoto-side white balance gain based on a telephoto-side integration ratio, wherein the telephoto-side integration ratio is a ratio of respective integration values of the plurality of telephoto-side color components within the telephoto-side integration range; and correct the telephoto image data based on the telephoto-side white balance gain.

* * * * *